(12) United States Patent  
Ward et al.

(10) Patent No.: US 9,097,390 B1  
(45) Date of Patent: Aug. 4, 2015

(54) WINERY STORM WATER PROTECTION SYSTEM

(71) Applicants: John M. Ward, Napa, CA (US); Carlos E. Chamberlain, Auburn, CA (US)

(72) Inventors: John M. Ward, Napa, CA (US); Carlos E. Chamberlain, Auburn, CA (US)

(*) Notice: Subject to any disclaimer, the term of this patent is extended or adjusted under 35 U.S.C. 154(b) by 148 days.

(21) Appl. No.: 14/019,305

(22) Filed: Sep. 5, 2013

Related U.S. Application Data

(60) Provisional application No. 61/697,740, filed on Sep. 6, 2012.

(51) Int. Cl.
*E03F 1/00* (2006.01)
*E03F 5/10* (2006.01)
*F17D 1/08* (2006.01)

(52) U.S. Cl.
CPC . *F17D 1/08* (2013.01); *E03F 1/001* (2013.01); *C02F 2209/005* (2013.01); *E03F 5/107* (2013.01)

(58) Field of Classification Search
CPC .............. F17D 1/08; E03F 1/00; E03F 1/001; E03F 5/107; C02F 2209/005; C02F 2209/006; C02F 2209/008
USPC .......................... 137/78.1, 78.5, 236.1, 487.5; 210/170.03
See application file for complete search history.

(56) References Cited

U.S. PATENT DOCUMENTS

| | | | | |
|---|---|---|---|---|
| 4,285,359 A | * | 8/1981 | Doherty | 137/205 |
| 5,035,581 A | * | 7/1991 | McGuire et al. | 417/36 |
| 5,342,144 A | * | 8/1994 | McCarthy | 405/39 |
| 5,551,598 A | * | 9/1996 | Cutsinger | 222/52 |
| 5,569,372 A | * | 10/1996 | Smith | 210/85 |
| 7,041,213 B1 | * | 5/2006 | McClanahan | 210/85 |
| 7,249,607 B2 | * | 7/2007 | Hansen et al. | 137/1 |
| 2005/0072469 A1 | * | 4/2005 | Preul | 137/247.13 |
| 2009/0223891 A1 | * | 9/2009 | Gauthier | 210/605 |
| 2011/0036783 A1 | * | 2/2011 | Chezar | 210/744 |

* cited by examiner

*Primary Examiner* — Craig Schneider
*Assistant Examiner* — David Colon Morales
(74) *Attorney, Agent, or Firm* — Dennis A. DeBoo

(57) ABSTRACT

A winery storm water protection system comprising a valve capsule assembly and a control system for automatically diverting precipitation such as rain water falling on a winery crush pad into a storm system such as a waterway and for automatically diverting waste water or liquid waste products falling on the winery crush pad into a process waste water system such as a process waste water tank for further processing.

20 Claims, 24 Drawing Sheets

WINERY STORM WATER PROTECTION SYSTEM

CROSS-REFERENCE TO RELATED APPLICATIONS

This application claims priority under 35 USC Section 119(e) to U.S. Provisional Patent Application No. 61/697,740, filed Sep. 6, 2012, the entire disclosure of which is incorporated herein by reference.

FIELD OF THE INVENTION

This invention relates generally to a storm water protection system comprising a valve capsule assembly and a control system for automatically diverting precipitation such as rain water into a storm water system such as a waterway and for automatically diverting waste water into a process waste water system such as a process waste water tank for further processing. In particular, this invention relates to a winery storm water protection system comprising a valve capsule assembly and a control system for automatically diverting rain water falling on a winery crush pad into a storm water system such as a waterway and for automatically diverting waste water or liquid waste products from the winery crush pad into a process waste water system such as a process waste water tank for further processing.

BACKGROUND OF THE INVENTION

Storm water is water that originates during precipitation events and does not require treatment before entering water ways. Storm water that does not soak into the ground becomes storm water runoff, which either flows directly into surface waterways or is channeled into storm sewers, which eventually discharge to surface waters. Storm water runoff is a source of pollution and it caused by precipitation flushing pollutants such as particulate matter, nutrients, heavy metals, organic toxins, et cetera into surface waters. Pollution from storm water runoff is aggravated by such activities as land clearing and urbanization, in the latter case due to the use of water impermeable material acting as a non-adsorbent collection surface for contaminants which are then flushed into surface waters via precipitation.

Recognition of the deleterious effects that storm water runoff has on surface waters has resulted in regulations for storm water treatment.

When we think of manufacturing and pollution, wineries are not the first thing that comes to mind for most of us. But in truth, wine making creates industrial pollutants that are harmful to our environment. Grape pomace (skin, pulp, seeds, and stalks) are all organic matter. Organic matter naturally reacts with oxygen and breaks down in the environment. This organic matter degrades into its elemental form (i.e. nutrients). Water bodies need nutrients to promote aquatic plant life and, in turn, the aquatic plant life produces oxygen for fish and other oxygen breathing aquatic life. However, if there is a lot of organic materials and wastes going through the natural process of biodegradation, the oxygen that is needed by fish and other oxygen breathing aquatic life is consumed by the organic wastes to reduce it to its elemental form (i.e. nutrients).

Additionally, overloading nutrients promotes excessive plant growth which blocks the sun in surface waters such as streams and creeks. When the water cannot soak up the sun's rays, plants cannot go through photosynthesis. Without photosynthesis, there is no oxygen for the oxygen breathing aquatic life.

Typically, at a winery, exposure of the winemaking process to precipitation does not occur with the exception of at the crush pad. Accordingly, storm water needs to be precluded from falling onto the crush pad during the use thereof or storm water that falls onto the crush pad during the use thereof needs to be conveyed to a process wastewater treatment system.

In an attempt to preclude storm water from falling onto the crush pad, roof structures where constructed over crush pad work areas. This approach is problematic for a multiplicity of reasons which include the cost of building materials, installation cost, and the increase in the carbon footprint associated with the building materials and the installation thereof. Additionally, these structures do not solve the problem of blowing rain that circumvents these roof structures.

Furthermore, the conventional methods of conveying storm water that falls onto the crush pad during the use thereof is also problematic in that these methods required human intervention and equipment that becomes inoperable due to the exposure to the predations of the environment.

Moreover, none of these methods account for accidental or unforeseen occurrences such as winery related spills.

Accordingly, there is a need for a storm water protection system that, inter alia, overcomes one or more of the significant shortcomings delineated hereinabove.

BRIEF SUMMARY OF THE INVENTION

Accordingly, and in one aspect, an embodiment of the invention ameliorates or overcomes one or more of the significant shortcomings delineated hereinabove by providing a storm water protection system that, inter alia, allows for the sharing of processed waste and storm water drainage systems in common facilities, reducing cost, and eliminating the requirement for covered structures over work areas. Eliminating the requirement of covered structures over work areas reduces the carbon footprint associated therewith. In particular, a reduction in greenhouse gas emissions is accomplished by the storm water protection system reducing the need for construction materials. Additionally, an embodiment of the storm water protection system operates in all-weather circumstances without human intervention.

More specifically, and in one aspect, an embodiment of the invention provides a storm water protection system, the system comprising: a valve capsule assembly, comprising in combination: an encapsulating capsule comprising: a hollow fluid impervious body having an open top end, an open bottom end, and a circumscribing sidewall extending between the open top end and the open bottom end, the circumscribing sidewall having an inner circumscribing surface defining an open ended chamber extending along a central longitudinal axis of the encapsulating capsule; a top lid detachably coupled on the open top end of the body for closing the open top end of the body; and a bottom lid permanently coupled on the open bottom end of the body for closing the open bottom end of the body wherein closing the open top and bottom ends of the body with the top and bottom lids closes the open ended chamber for forming an isolation chamber of the encapsulating capsule; a valve assembly disposed within the isolation chamber of the encapsulating capsule, the valve assembly comprising: a valve body having a fluid passage including a upstream port and a downstream port; a valve member located within the valve body wherein the valve member is configured to move between an open position to allow fluid flow between the upstream port and the downstream port and a closed position to block fluid flow between the upstream port and the downstream port; an upstream pipeline extending through a first opening in the circumscribing sidewall of the encapsulating capsule, the upstream pipeline having a first end operatively coupled to the upstream port of the fluid passage of the valve body and a second end disposed exteriorly of the encapsulating capsule; and a downstream pipeline extending through a second opening in the circumscribing sidewall of the encapsulating capsule, the downstream pipeline having a first end operatively coupled to the downstream port of the fluid passage of the valve body and a second end disposed exteriorly of the encapsulating capsule. The storm water protection system further comprises a control system operatively coupled to the valve capsule assembly for controlling the valve assembly including orchestrating the opening and closing of the valve member.

In another aspect, an embodiment of the invention provides a winery storm water protection system, the system comprising: an encapsulating capsule disposed under a crush pad of a winery, the encapsulating capsule comprising an interior isolation chamber; a valve assembly disposed within the isolation chamber of the encapsulating capsule, the valve assembly comprising: a valve body having a fluid passage including a upstream port and a downstream port; and a valve member located within the valve body wherein the valve member is configured to move between an open position to allow fluid flow between the upstream port and the downstream port and a closed position to block fluid flow between the upstream port and the downstream port; and an electric actuator assembly operatively coupled to the valve member for opening or closing the valve member when actuated; an upstream pipeline extending through a first opening in the circumscribing sidewall of the encapsulating capsule, the upstream pipeline having a first end operatively coupled to the upstream port of the fluid passage of the valve body and a second end operatively coupled to and in open fluid communication with a crush pad drain assembly disposed in and under the crush pad of the winery; a downstream pipeline extending through a second opening in the circumscribing sidewall of the encapsulating capsule, the downstream pipeline having a first end operatively coupled to the downstream port of the fluid passage of the valve body and a second end operatively coupled to and in open fluid communication with a holding tank; a rain sensor; a programmable logic controller operatively coupled to the electric actuator assembly and the rain sensor; the programmable logic controller being configured to provide a control signal to the electric actuator assembly in response to receiving a rain sensed signal from the rain sensor to actuate the closing of the valve member from a default open position for closing fluid communication between the crush pad drain assembly disposed in and under the crush pad of the winery and the holding tank while simultaneously opening fluid communication between the crush pad drain assembly and a storm drain system or waterway; and the programmable logic controller being configured to provide a control signal to the electric actuator assembly in order to massage the valve member by opening and closing the valve member after a predefined period of time in which a rain sensed signal has not been received to keep the valve member free of binding or clear of debris build up.

In another aspect, an embodiment of the invention provides a winery storm water protection process, said process comprising: providing a valve capsule assembly buried in earth under and with recess relative to a crush pad of a winery, said valve capsule assembly comprising a valve assembly having a valve member configured to move between an open position to allow open fluid flow communication between an upstream crush pad drain assembly disposed in and under the crush pad of the winery and a downstream holding tank and a closed position to provide open fluid flow communication between the upstream crush pad drain assembly and a storm drain system or waterway; sensing rain; and controlling the closing and opening of the valve member as a function of the sensed rain wherein the valve member is closed upon a presence of sensed rain and remains open in an absence of sensed rain wherein the closed valve member precludes open fluid flow communication between the upstream crush pad drain assembly disposed in and under the crush pad of the winery and the downstream holding tank and wherein the open valve member provides open fluid flow communication between the upstream crush pad drain assembly disposed in and under the crush pad of the winery and the downstream holding tank.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
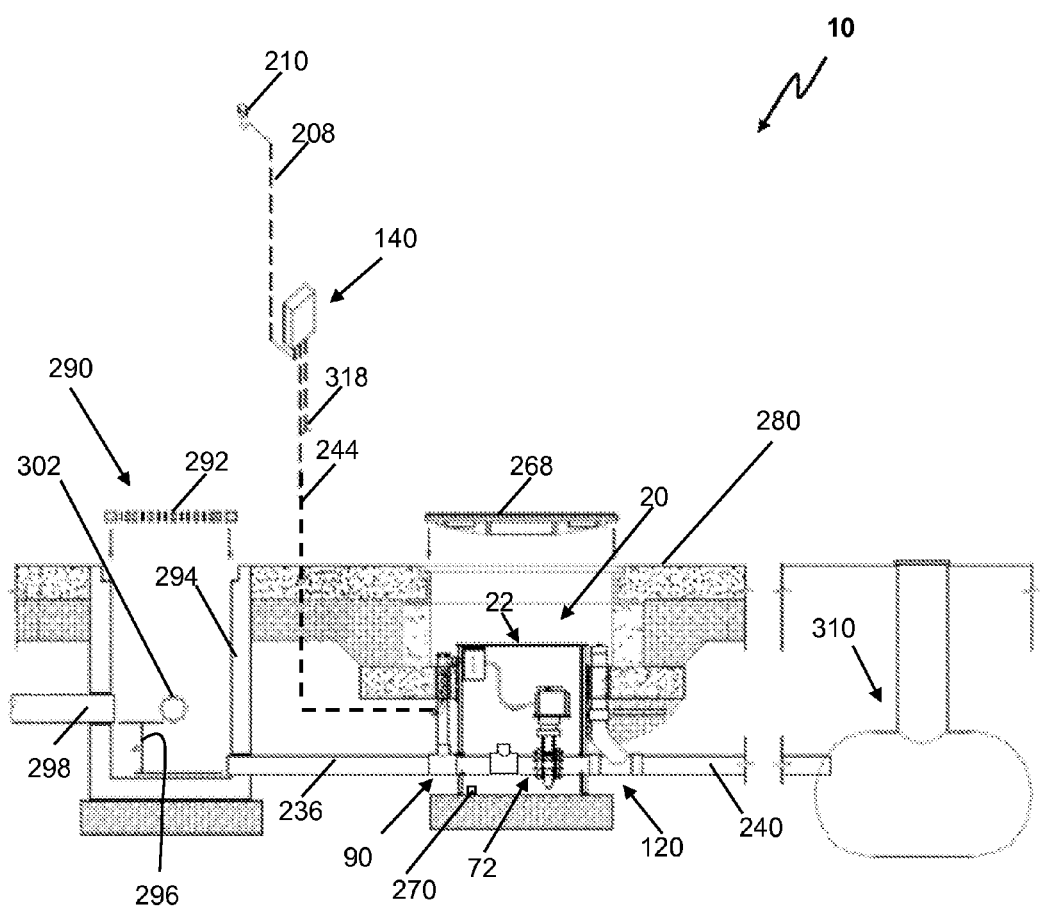
FIG. 1 is a partial side sectional view of an embodiment of a storm water protection system comprising a valve capsule assembly disposed under a crush pad of a winery and a control system operatively coupled to the valve capsule assembly for providing, under the orchestration of the control system, fluid communication between at least one crush pad or drop inlet drain assembly and a process waste water system such as a process waste water tank or holding tank.

Considering the drawings, wherein like reference numerals denote like parts throughout the various drawing figures, reference numeral 10 is directed to an embodiment of a winery storm water protection system.

System Overview

Referring to FIG. 1, the winery storm water protection system 10 is comprised of a valve capsule assembly 20 disposed under a crush pad 280 of a winery and a control system 140 operatively coupled to the valve capsule assembly 20 for providing, under the orchestration of the control system 140, open and closed fluid communication between at least one crush pad or drop inlet drain assembly 290 disposed in and under the crush pad 280 and a holding tank 310.

Figure 2:
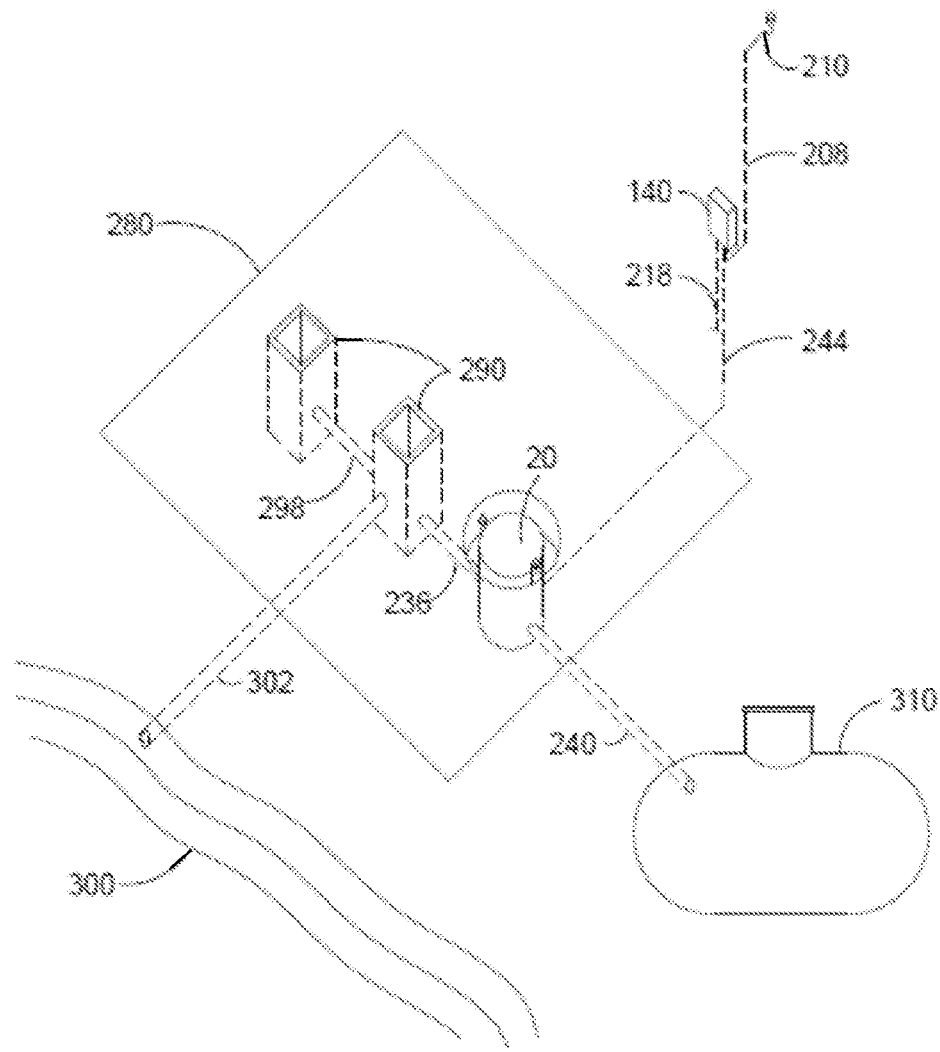
FIG. 2 is a diagrammatical view of an embodiment of the storm water protection system comprising the valve capsule assembly disposed under the crush pad of the winery and the control system operatively coupled to the valve capsule assembly for providing, under the orchestration of the control system, fluid communication between at least one crush pad or drop inlet drain assembly and the process waste water system such as the tank or a storm water system such as a waterway.
Figure 3:
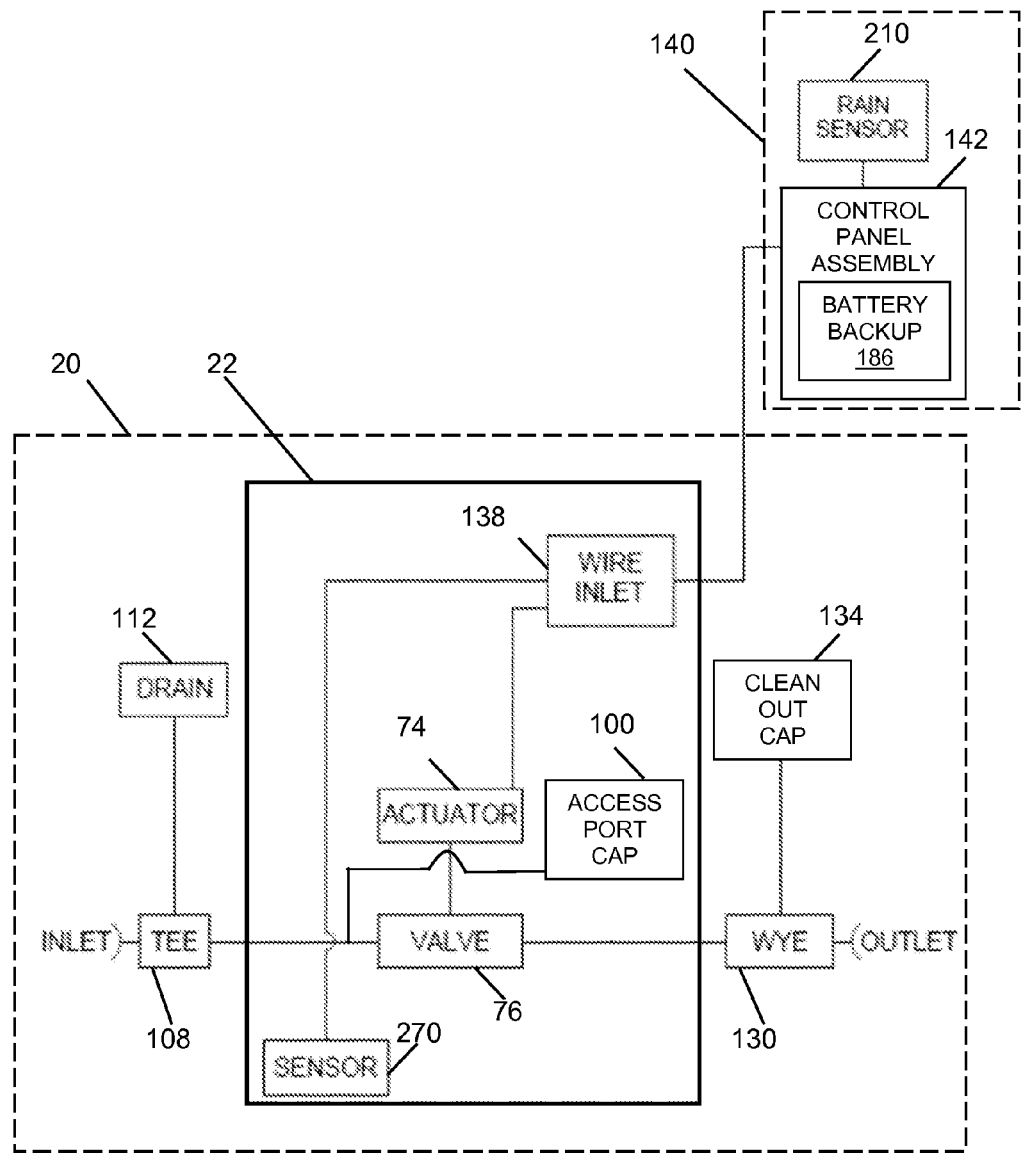
FIG. 3 is a general block diagram view of an embodiment of the storm water protection system comprising the valve capsule assembly and control system.

More particularly, and referring to FIGS. 1 through 3, the valve capsule assembly 20 comprises a capsule 22 encapsulating a valve assembly 72. The valve assembly 72 comprises an electric actuator assembly 74 operatively coupled to a valve member 76. In turn, the electric actuator assembly 74 is operatively coupled to the control system 140 and the valve member 76 is interposed between an upstream pipeline 90 in fluid communication with the crush pad or drop inlet drain assembly 290 and a downstream pipeline 120 in fluid communication with the holding tank 310. Under the orchestration of the control system 140, the electric actuator assembly 74 moves the valve member 76 between an open position that allows fluid flow between the upstream crush pad or drop inlet drain assembly 290 and the holding tank 310 and a closed position that blocks fluid flow between the crush pad or drop inlet drain assembly 290 and the holding tank 310. With the valve member 76 in the closed position, fluid entering the crush pad or drop inlet drain assembly 290 causes the fluid level therein to rise. Once the fluid level in the crush pad or drop inlet drain assembly 290 reaches a predefined height 296, the fluid is conveyed to a waterway 300 via pipeline 302.

Figure 4:
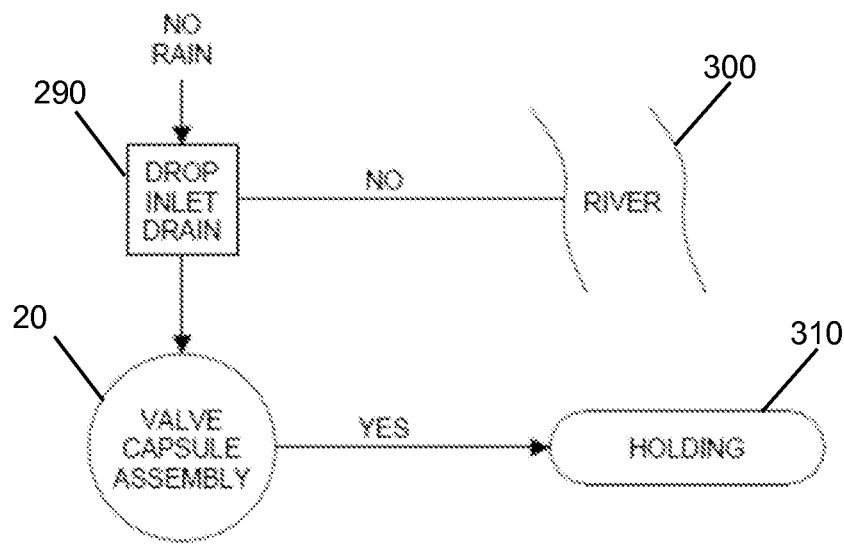
FIG. 4 is a diagrammatical view of an embodiment of the storm water protection system feeding fluid to a process waste water system such as the process waste water tank or holding tank for further processing.

FIG. 4 diagrammatically illustrates an embodiment of the general use and operation of the control system 140 orchestrating the valve assembly 72 to have a default open position or first state for opening fluid communication between the crush pad or drop inlet drain assembly 290 and the holding tank 310 and for closing fluid communication to the waterway 300 such as a river.

Figure 5:
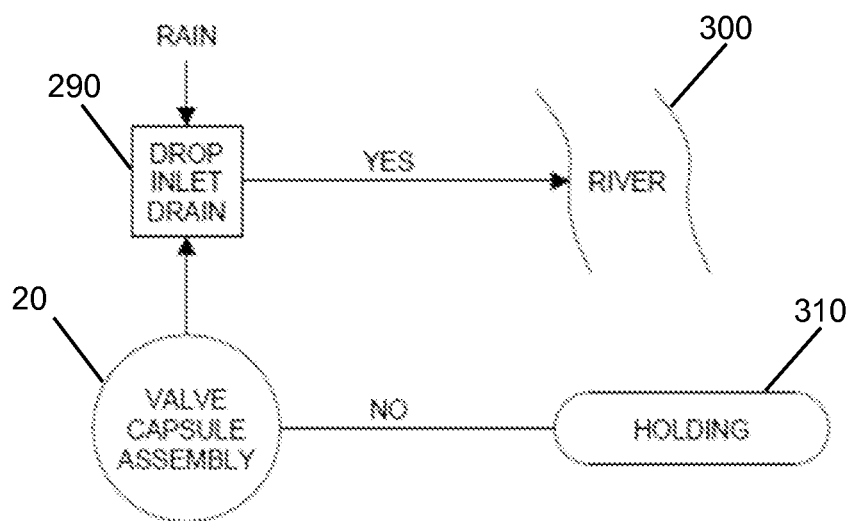
FIG. 5 is a diagrammatical view of an embodiment of the storm water protection system feeding fluid to a storm water system such as the waterway.

FIG. 5 diagrammatically illustrates an embodiment of the general use and operation of the control system 140 orchestrating the valve assembly 72 to have a closed position or second state upon the sensing of precipitation such as rain for closing fluid communication between the crush pad or drop inlet drain assembly 290 and the holding tank 310 thereby blocking the passage of rainwater from entering the holding tank 310 and for opening fluid communication to the waterway 300 such as the river for conveying the rainwater to the waterway 300 once the rainwater has filled the crush pad or drop inlet drain assembly 290 to the predetermined height 296.

Valve Capsule Assembly 20

Figure 6:
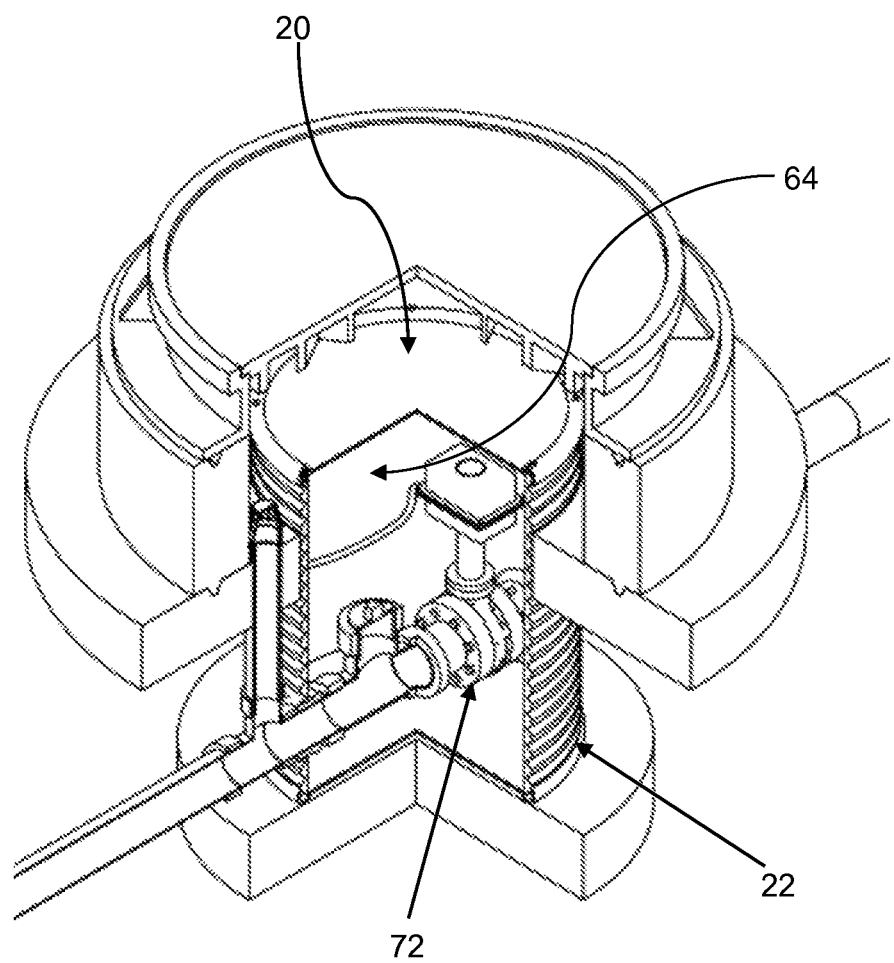
FIG. 6 is a partial cutaway perspective view of an embodiment of a man hole system and an embodiment of the valve capsule assembly.

More specifically, and referring to FIG. 6, an embodiment of the valve capsule assembly 20 comprises a cylindrically shaped encapsulating capsule 22 and a valve assembly 72.

Encapsulating Capsule 22

Figure 7:
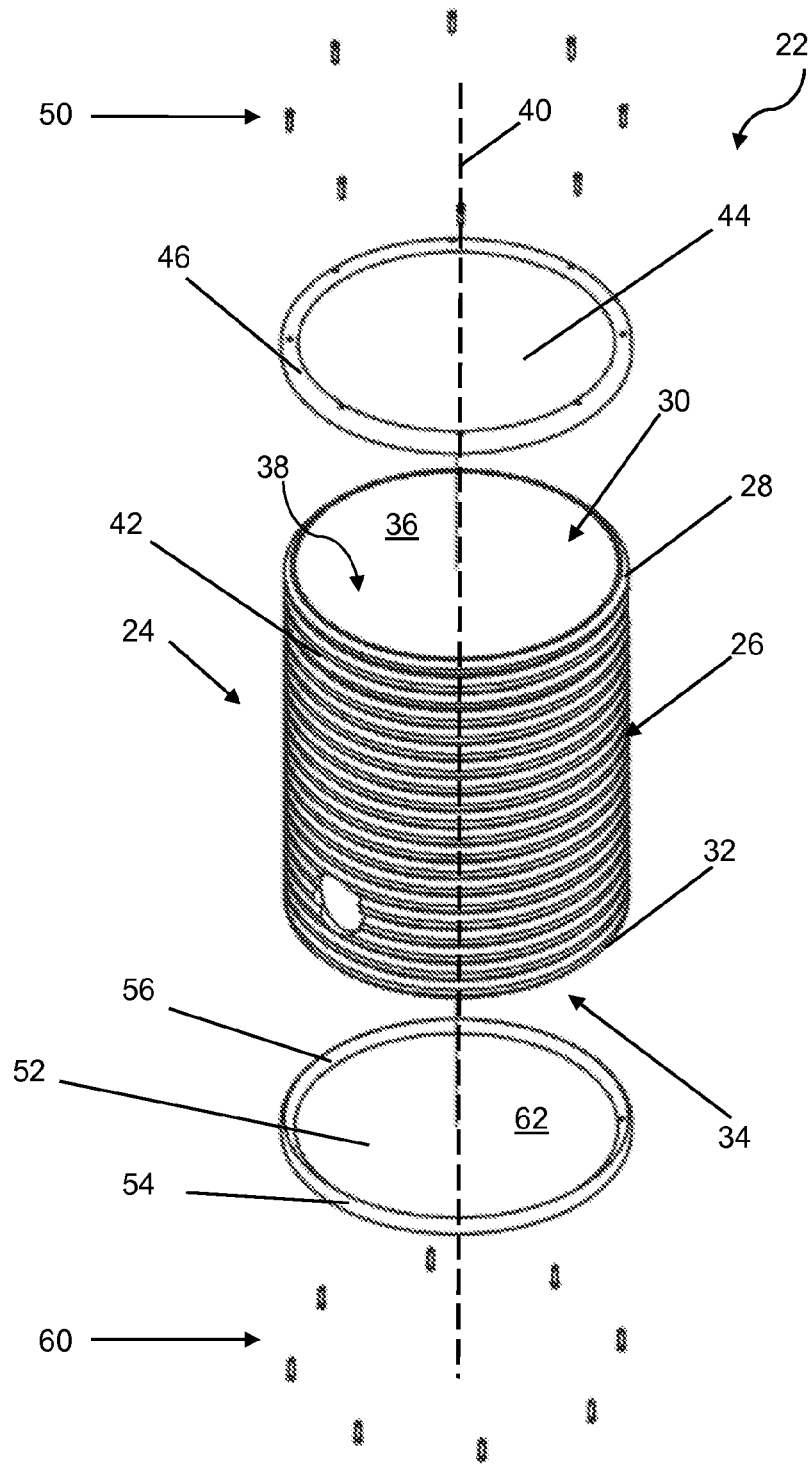
FIG. 7 is an exploded parts view of an encapsulating capsule of an embodiment of the valve capsule assembly.

Referring to FIG. 7, the encapsulating capsule 22 comprises a hollow fluid impervious body 24 having a circumscribing or cylindrical sidewall 26 extending between an upper annular edge 28 defining an open top end 30 and a lower annular edge 32 defining an open bottom end 34. In one embodiment, the circumscribing or cylindrical sidewall 26 comprises a substantially smooth inner circumscribing or cylindrical surface 36 extending between the open ends and defining an open ended chamber 38 extending along a central longitudinal axis 40 of the encapsulating capsule 22. In this embodiment, the circumscribing or cylindrical sidewall 26 further comprises a ribbed outer circumscribing or cylindrical surface 42 extending between the open ends.

Additionally, the encapsulating capsule 22 comprises a substantially flat top lid 44 having a downwardly turned hooked shaped outer peripheral lip 46 defining a bottom surface annular groove 48 (FIG. 8) in the top lid 44. The top lid 44 is detachably coupled on the open top end 30 of the hollow fluid impervious body 24. Specifically, the downwardly turned hooked shaped outer peripheral lip 46 of the top lid 44 is configured to receive the upper annular edge 28 of the hollow fluid impervious body 24 and is fastened thereto via a plurality of fasteners 50 in the form of, but not limited to, stainless steel screws.

Furthermore, the encapsulating capsule 22 comprises a substantially flat bottom lid 52 having an upwardly turned annular hooked shaped outer peripheral lip 54 defining a top surface annular groove 56 in the bottom lid 52. The bottom lid 52 is generally permanently coupled on the open bottom end 34 of the hollow fluid impervious body 24. Specifically, the upwardly turned annular hooked shaped outer peripheral lip 54 of the bottom lid 52 is configured to receive the lower annular edge 32 of the hollow fluid impervious body 24 with an annular bead of epoxy 58 (FIG. 8) interposed between edge 32 and lip 54. A plurality of fasteners 60 in the form of, but not limited to, stainless steel screws further secure the bottom lid 52 to the hollow fluid impervious body 24 of the encapsulating capsule 22 of the valve capsule assembly 20.

Closing the open top end 30 with top lid 44 and the open bottom end 34 with bottom lid 52 closes the open ended chamber 38 for defining or forming an isolation chamber 64 (FIG. 8) of the encapsulating capsule 22.

In one embodiment, the hollow fluid impervious body 24 is formed from, but not limited to, a PVC material and has a twenty-four inch diameter and twenty-four inch length. Additionally, and in one embodiment, the top lid 44 and bottom lid 52 formed from, but not limited to, a fiberglass material configured in size to the hollow fluid impervious body 24.

Valve Assembly 72

Figure 8:
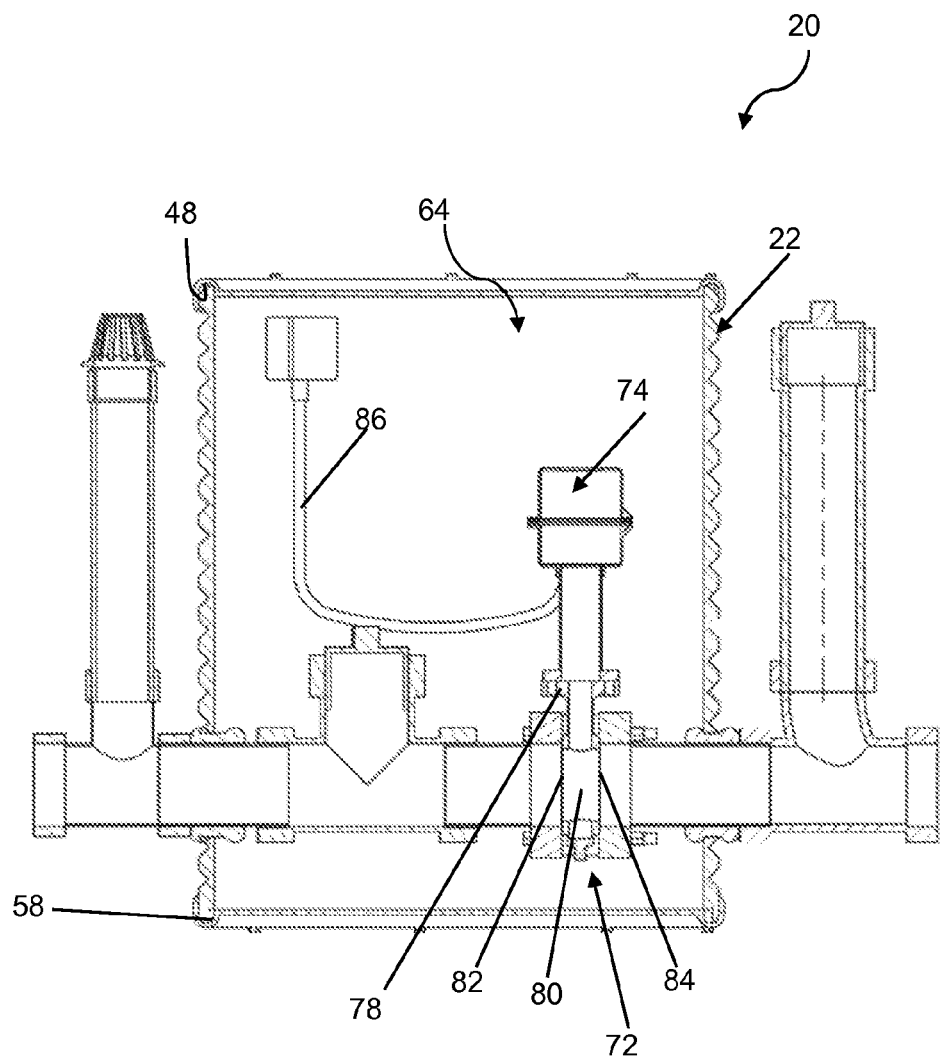
FIG. 8 is a sectional elevational view of an embodiment of the valve capsule assembly.

Referring to FIG. 8, and as delineated above, an embodiment of the valve capsule assembly 20 comprises the valve assembly 72 disposed within the isolation chamber 64 of the encapsulating capsule 22.

Figure 9:
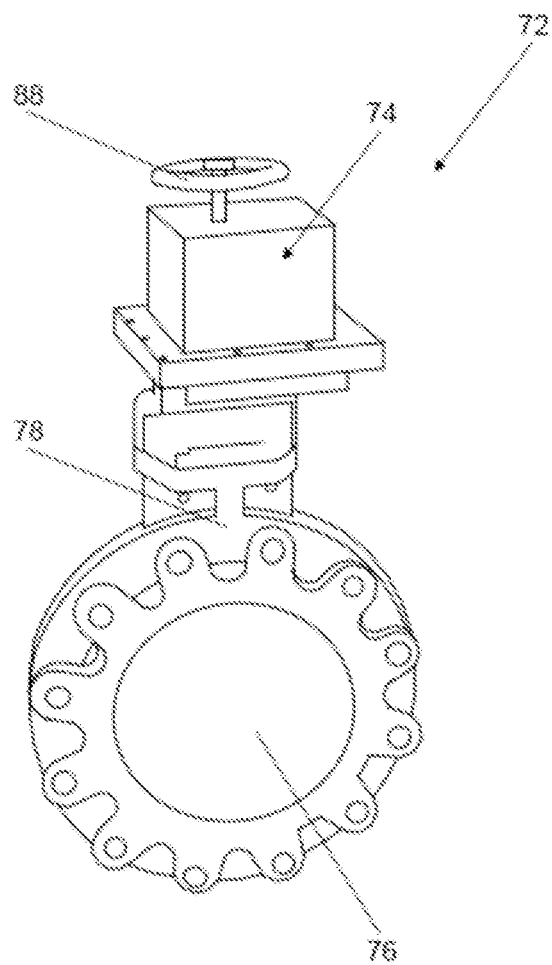
FIG. 9 is a perspective view of an embodiment of an electric actuated valve assembly of an embodiment of the valve capsule assembly.

Referring to FIGS. 8 and 9, and in one embodiment, the valve assembly 72 comprises an electric actuator assembly 74 operatively coupled to a valve member 76 (FIG. 9) disposed within a valve body 78. The valve body 78 includes a fluid passage 80 including an upstream or first port 82 and a downstream or second port 84. The electric actuator assembly 74 is electrically coupled to the control system 140 by way of electric power line 86 for orchestrating the control of the valve member 76 as further delineated below. In general, and under the orchestration of the control system 140 actuating the electric actuator assembly 74, the valve member 76 (FIG. 9) moves between an open position to allow fluid flow between the upstream port 82 and the downstream port 84 and a closed position to block fluid flow between the upstream port 82 and the downstream port 84.

In one embodiment, and as illustrated in FIG. 9, the valve assembly 72 includes a manual valve override handle 88 for manually opening or closing the valve member 76.

In one embodiment, the valve assembly 72 is in the form of, but not limited to, an electric actuated butterfly or ball valve; however, other valve types may be employed. An example of an electric actuated butterfly valve assembly is a SPEARS butterfly valve premium electric actuation package and one example of an electric actuated ball valve is a SPEARS true union 2000 ball valve premium electric actuation package.

Upstream and Downstream Pipelines

Figure 10:
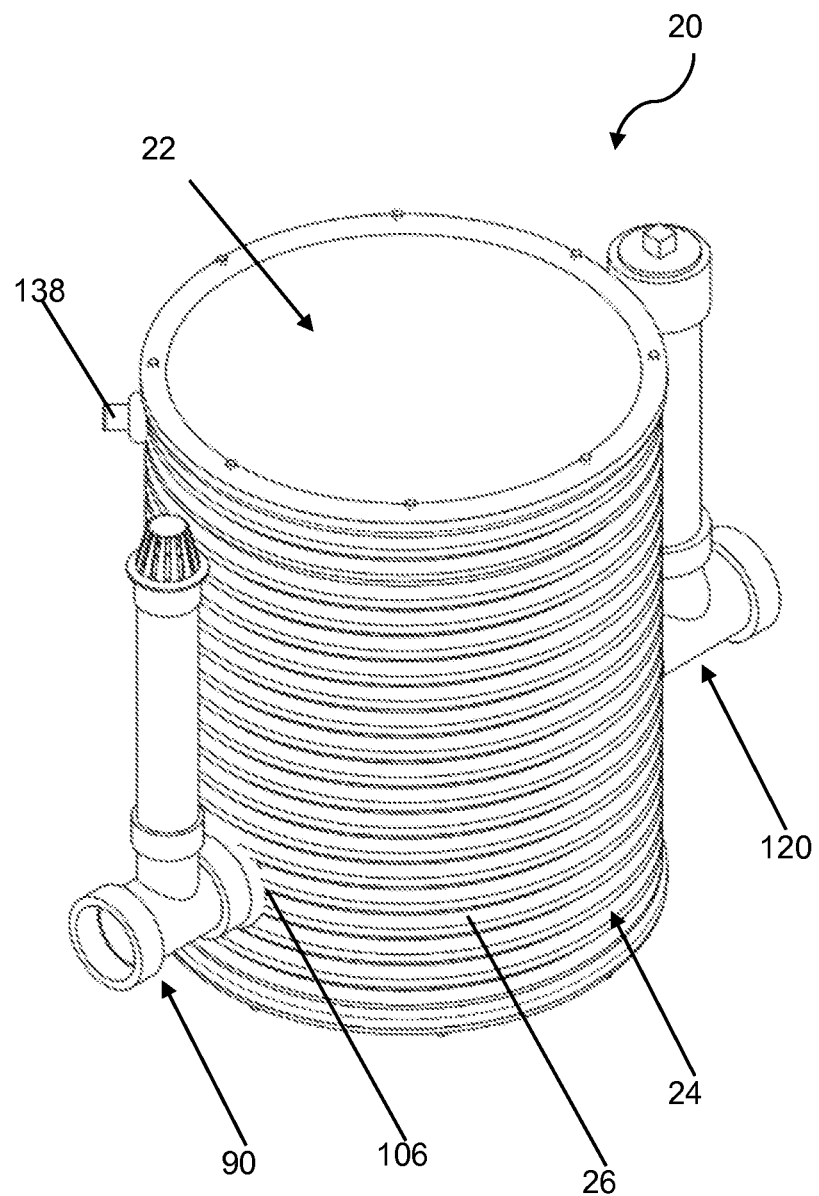
FIG. 10 is an upstream side perspective view of an embodiment of the valve capsule assembly.

Referring to FIG. 10, an embodiment of the valve capsule assembly 20 further comprises a piping assembly comprised of an upstream pipeline 90 and a downstream pipeline 120.

Figure 11:
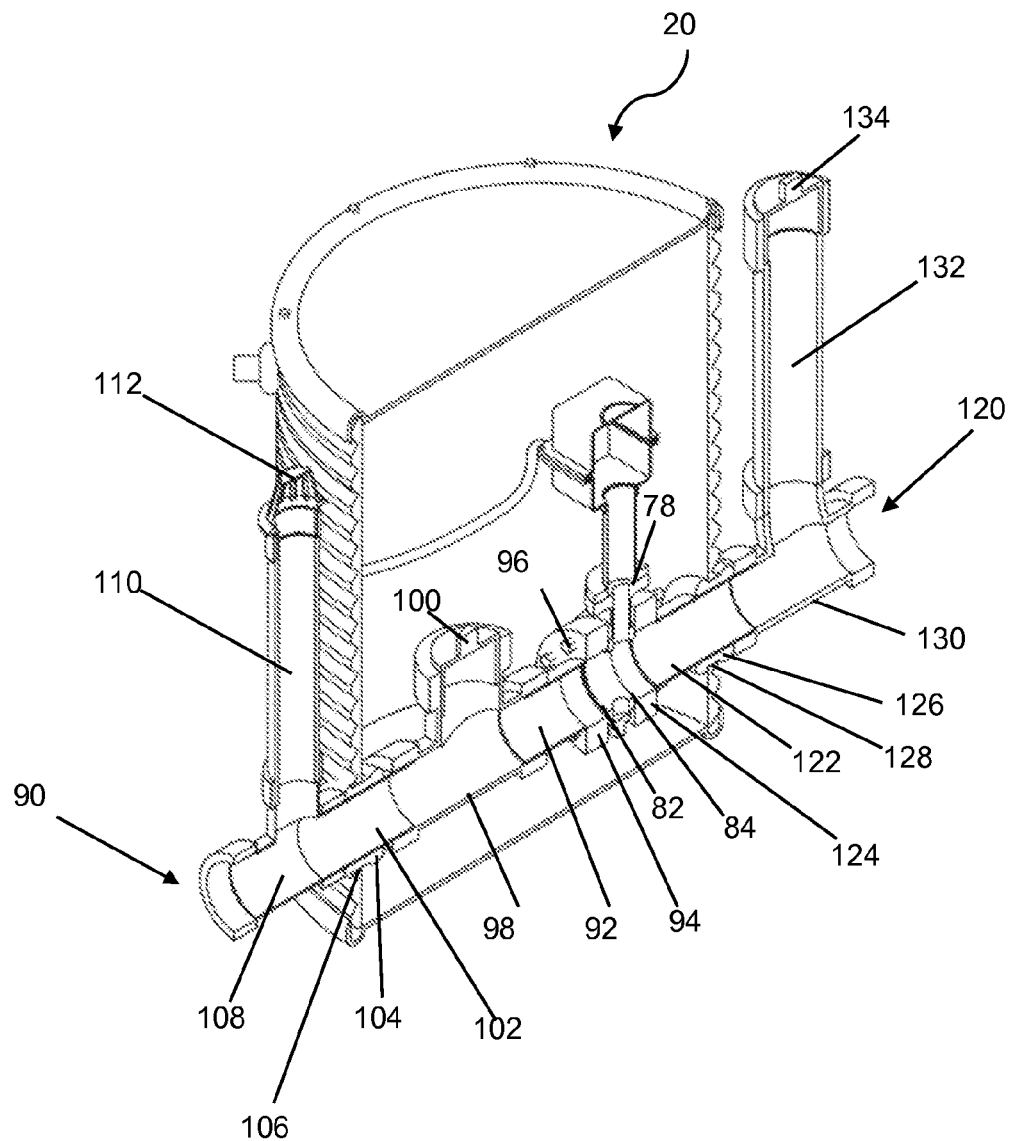
FIG. 11 is a sectional perspective view of an embodiment of the valve capsule assembly.
Figure 12:
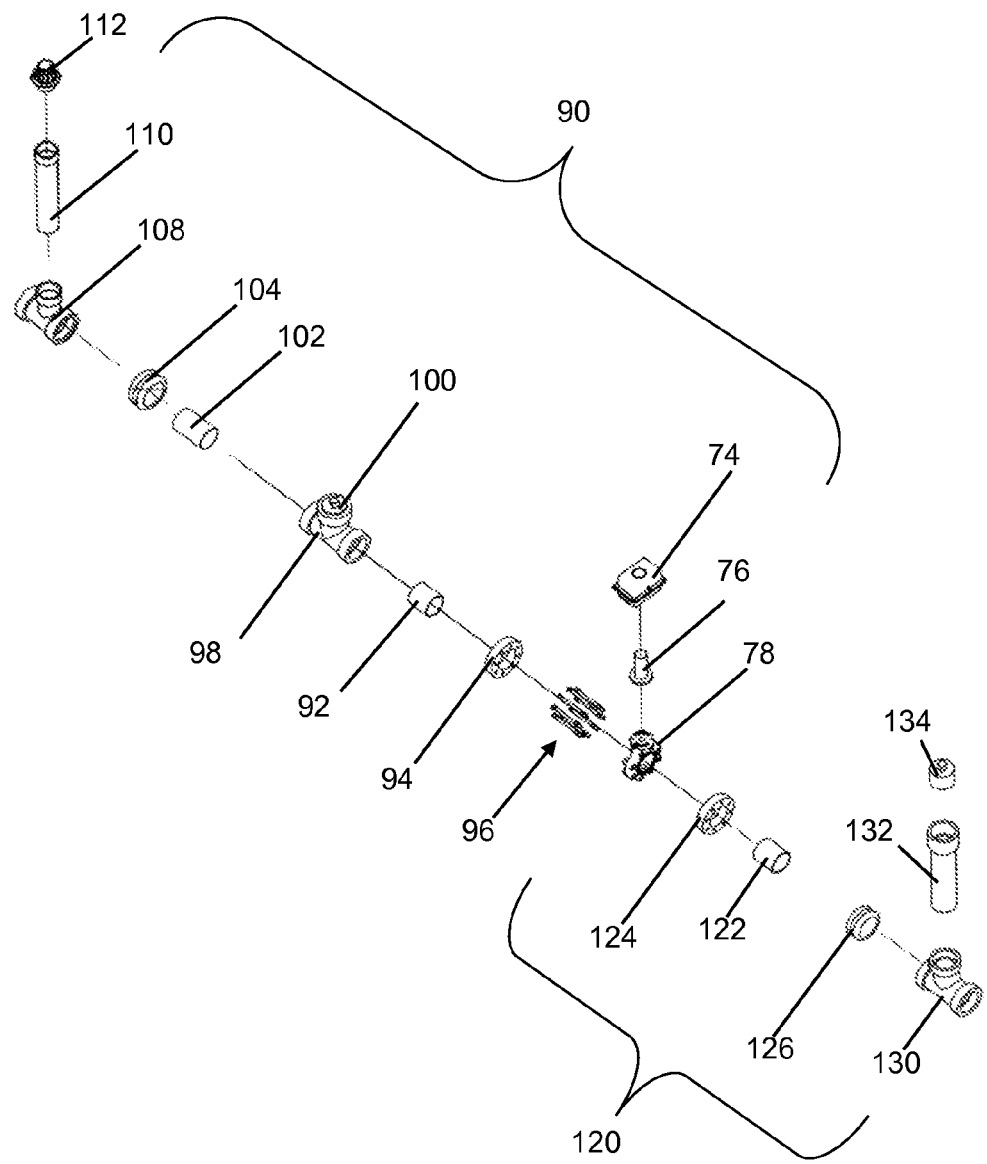
FIG. 12 is an exploded parts view of an upstream and a downstream pipeline of an embodiment of the valve capsule assembly.

Referring to FIGS. 10 through 12, the upstream pipeline 90 comprises a first main upstream water pipe 92 having a first end and the downstream pipeline 120 comprises a first main downstream water pipe 122 having a first end wherein the first ends of the main upstream and downstream water pipes 92, 122 are respectively coupled to the upstream and downstream ports 82, 84 of the valve body 78 by means of flanged couplings 94, 124 respectively by utilizing bolts 96.

Upstream Pipeline 90

In turn, a second end of the main upstream water pipe 92 is connected to a first opening of a first three opening fitting 98 such as a first T-type fitting as illustrated in FIG. 11. A second opening of the first three opening fitting 98 is fitted with a removable cap 100 such that second opening functions as cleanout access way for allowing a clean out mechanism such as a plumbing snake to enter the upstream pipeline 90. A third opening, opposing said first opening, of the first three opening fitting 98 is connected to a first end of a second main upstream water pipe 102 that traverses through a gasket 104 fitted within an opening 106 in the cylindrical sidewall 26 of the hollow fluid impervious body 24. After passing through the gasket 104, the second main upstream water pipe 102 terminates to a second end exteriorly of the encapsulating capsule 22 and connects with a first opening of a second three opening fitting 108 such as a second T-type fitting as illustrated in FIG. 11. A second opening of the second three opening fitting 108 is connected to a upwardly extending riser pipe 110 which is capped off by a drain cap 112 capable of blocking debris. The drain cap 112 and riser pipe 110 function as a debris filtering conduit for allowing fluid to drain from a manhole area that will be delineated in further detail below. A third opening, opposing said first opening, of the second three opening fitting 108 is connected to a first end of an exterior main upstream water pipe 236 (FIG. 1) that traverses through an opening in the buried circumscribing sidewall 294 of the crush pad or drop inlet drain assembly 290 that will be delineated in further detail below.

Downstream Pipeline 120

As described above, the first end the main downstream water pipe 122 is coupled to the downstream port 84 of the valve body 78 by means of flanged coupling 124. From the flanged coupling 124, the main downstream water pipe 122 traverses through a gasket 126 fitted within an opening 128 in the cylindrical sidewall 26 of the hollow fluid impervious body 24. After passing through the gasket 126, the main downstream water pipe 122 terminates to a second end exteriorly of the encapsulating capsule 22 and connects with a first opening of a third three opening fitting 130 such as a Y-type fitting. A second opening of the third three opening fitting 130 is connected to an upwardly extending riser pipe 132 which is capped off by a closed cap 134. The riser pipe 132 extends from below the top of grade to above and provides a cleanout means or access of the downstream pipeline 120 for allowing a clean out mechanism such as a plumbing snake to enter the downstream pipeline 120. A third opening, opposing the first opening, of the third three opening fitting 130 is connected to a first end of an exterior main downstream water pipe 240 (FIG. 1) that traverses with a declivity to a second end that connects to the holding tank 310 or like.

Installation Process for Valve Capsule Assembly 20

Figure 13:
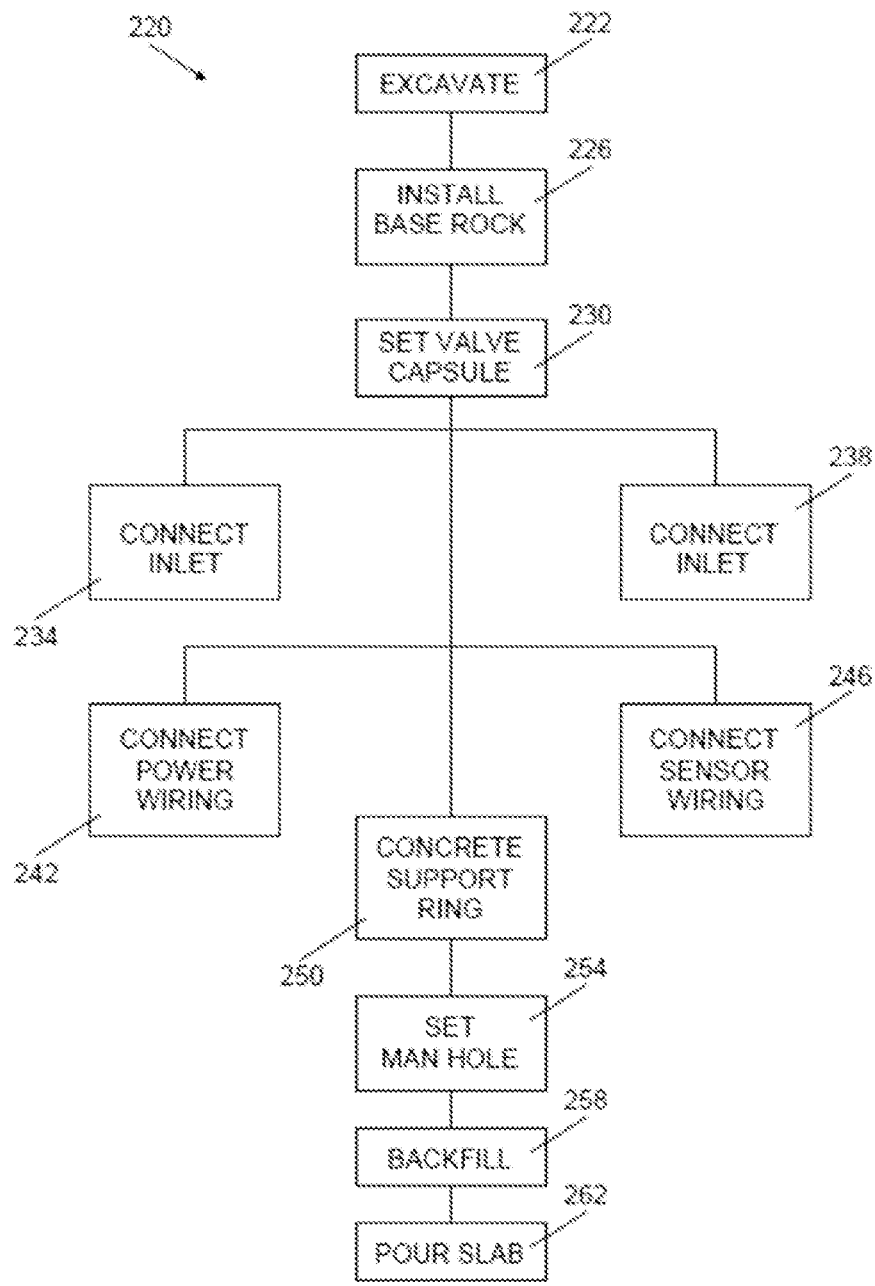
FIG. 13 is block diagram view of an embodiment of an installation process of an embodiment of the valve capsule assembly.
Figure 14:
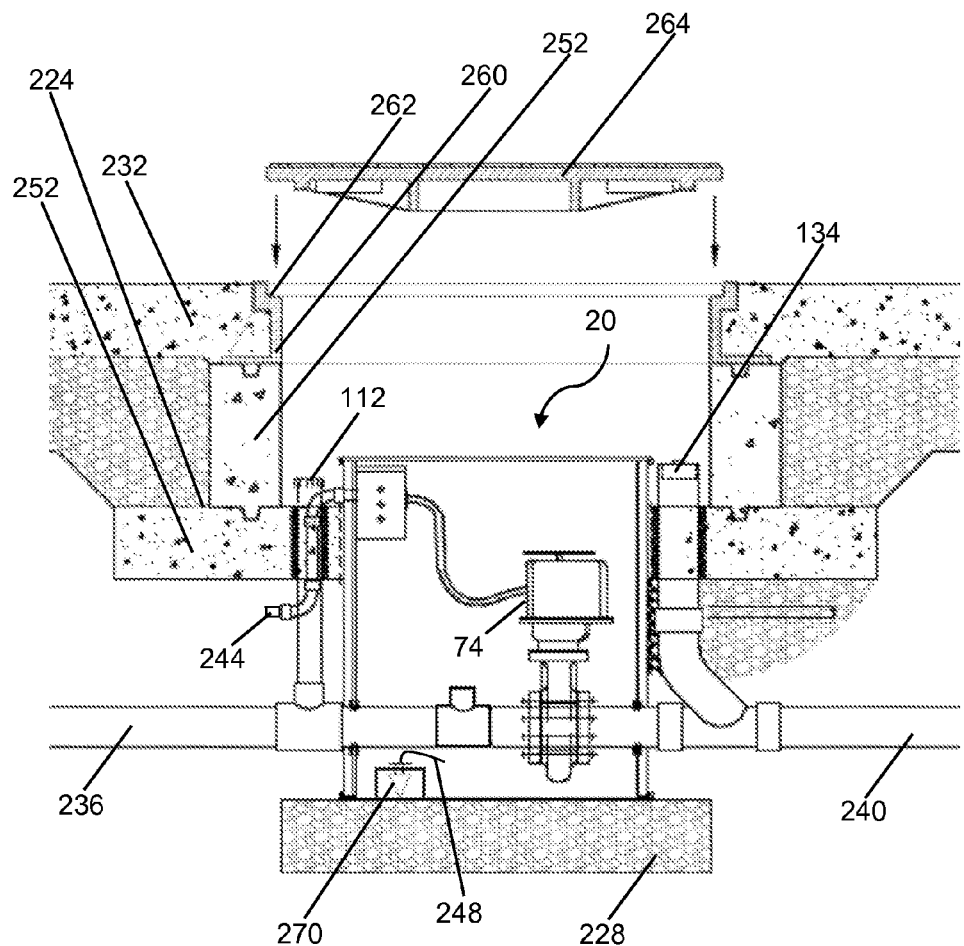
FIG. 14 is a sectional elevational view of an embodiment of the valve capsule assembly installed in accordance with an embodiment of the installation process.

Referring to FIGS. 13 and 14, an initial installation process 220 comprising a step 222 of excavating a hole 224 for receiving the valve capsule assembly 20 disposed therein with recess.

The process 220 comprising a further step 226 of installing base rock 228.

The process 220 comprising a further step 230 of setting the valve capsule assembly 20 onto the base rock 228 wherein the hole 224 is configured so that the valve capsule assembly 20 is disposed therein with recess relative to the crush pad 232.

The process 220 comprising a further step 234 of connecting the exterior main upstream water pipe 236 to at least the one crush pad or drop inlet drain assembly 290.

The process 220 comprising a further step 238 of connecting the exterior main downstream water pipe 240 to at least the one holding tank 310.

The process 220 comprising a further step 242 of connecting the power wiring 244 between the electric actuator assembly 74 and the control system 140.

The process 220 comprising a further step 246 of connecting the sensor wiring 248 between the sensor 270 and the control system 140.

The process 220 comprising a further step 250 of installing a concrete support ring 252.

The process 220 comprising a further step 254 of setting the man hole system comprising setting a grade beam 260, a manhole ring 262, and a man hole cover 264 for structurally covering the valve capsule assembly 20 for allowing vehicle traffic including heavy trucks to drive over the valve capsule assembly 20.

The process 220 comprising a further step 258 of backfilling the hole 224 with the valve capsule assembly 20 disposed therein with recess.

The process 220 comprising a further step 262 of pouring slab which is part of the crush pad 232.

Control System 140

Referring to FIGS. 15 through 22, the winery storm water protection system 10 further comprises control system 140.

Control Panel Assembly 142

Figure 18:
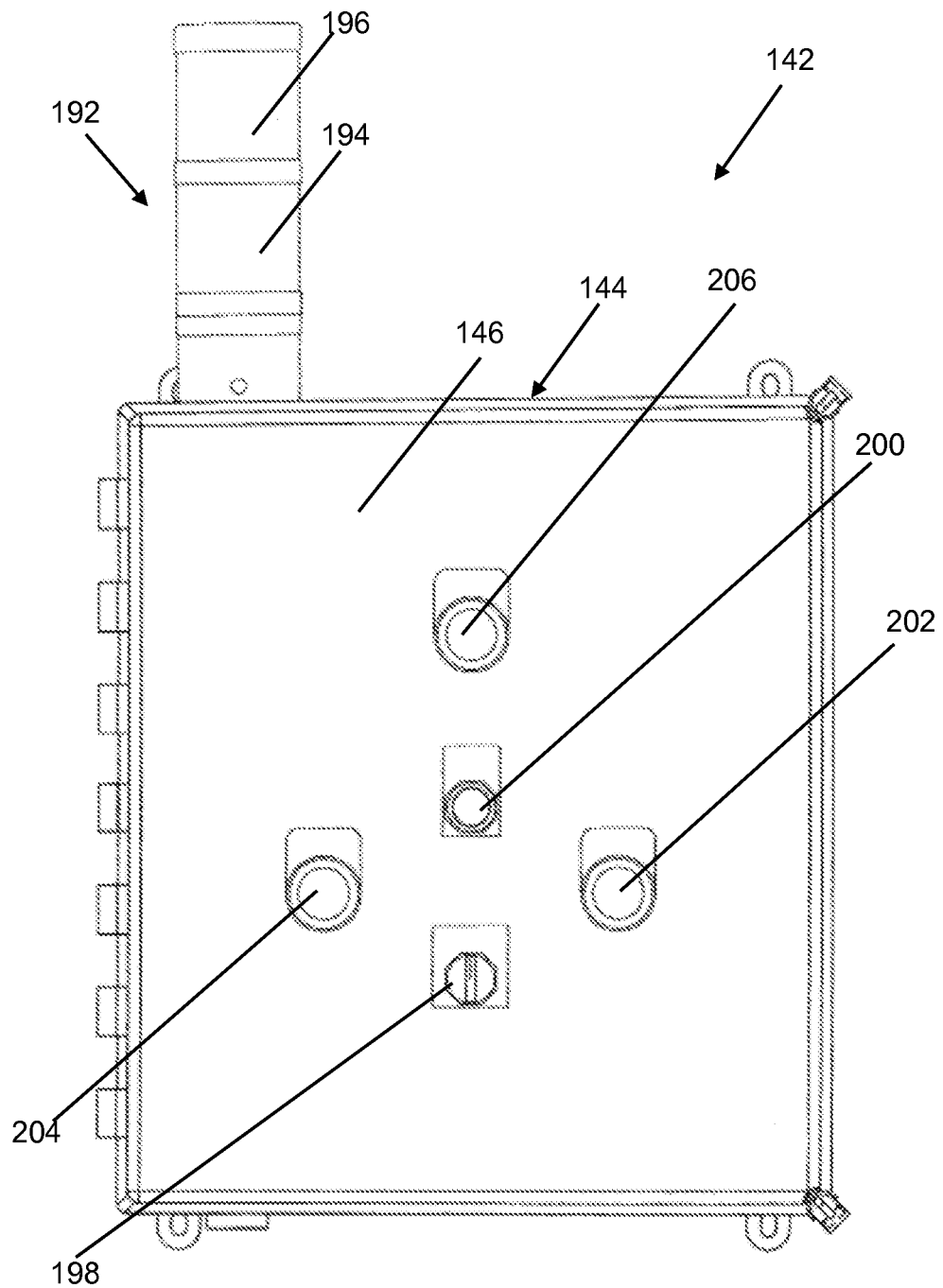
FIG. 18 is a front plane view of an embodiment of the portion of the control system that is housed in a common enclosure with the front cover shown in a closed position.
Figure 19:
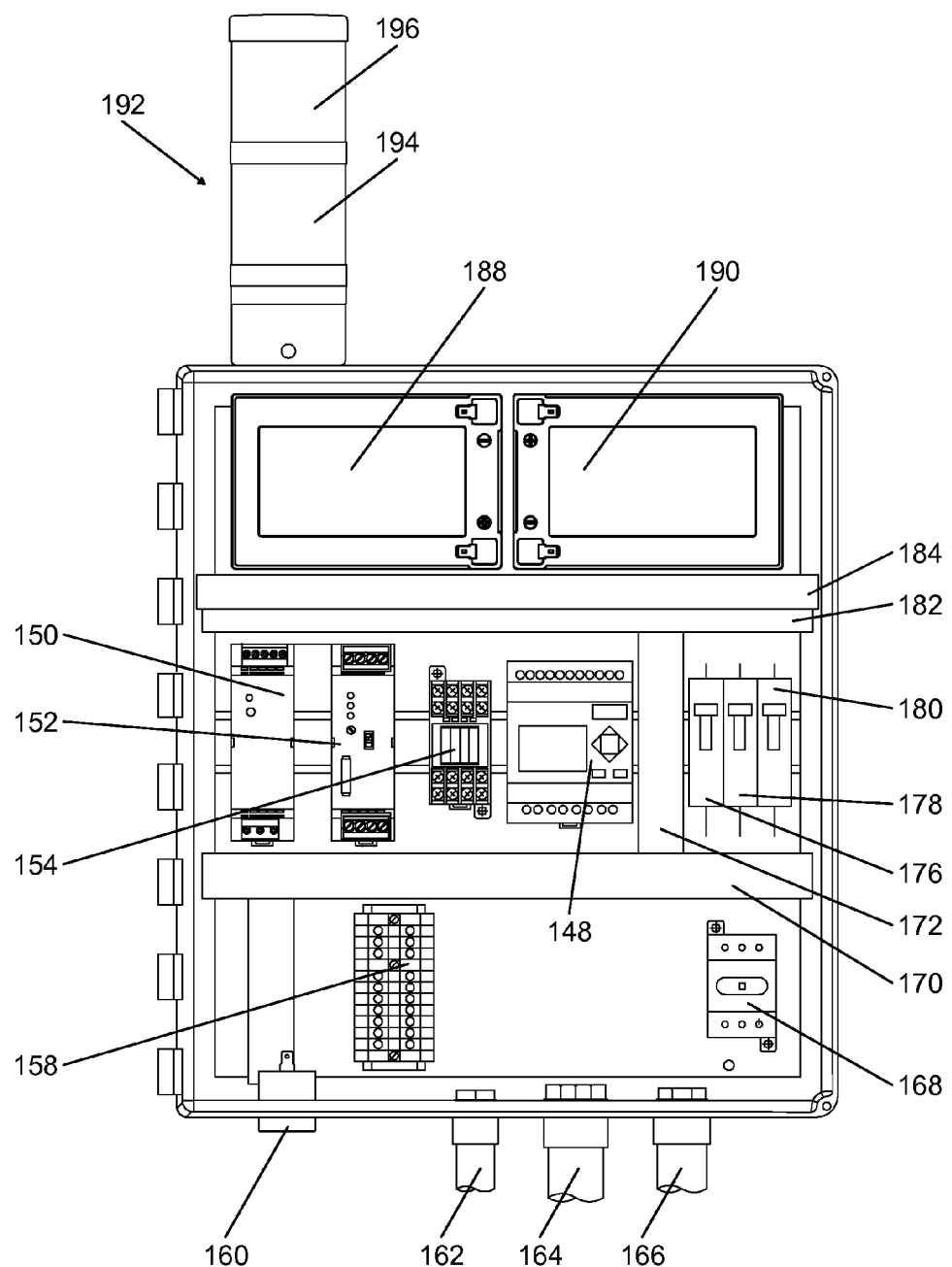
FIG. 19 is a front plane view of an embodiment of the portion of the control system that is housed in a common enclosure with a front cover removed therefrom.

The control system 140 comprises a control panel assembly 142. As illustrated in FIGS. 18 and 19, the control panel assembly 142 comprises an enclosure 144 including a cover 146. The enclosure 144 provides cover and peripheral surfaces for mounting electronic/electrical components thereto and a weather proof interior surface for mounting electronic/electrical components therein. The enclosure is designed to be mounted on an exterior wall or structure with in open view of a work area. Service people or workers should be able to see the cover and peripherally mounted indicator lights and ascertain the status of the system 10. For example, valve open, valve closed or rain sensor sensing rain as described herein.

In one embodiment, the enclosure 144 is in the form of, but not limited to, a NEMA 4 enclosure having 16×14×8 inch dimension. One example of this type of enclosure is manufactured by HOFFMAN under model number A16148CHFL.

Processing Unit/Logic Module 148

Figure 15:
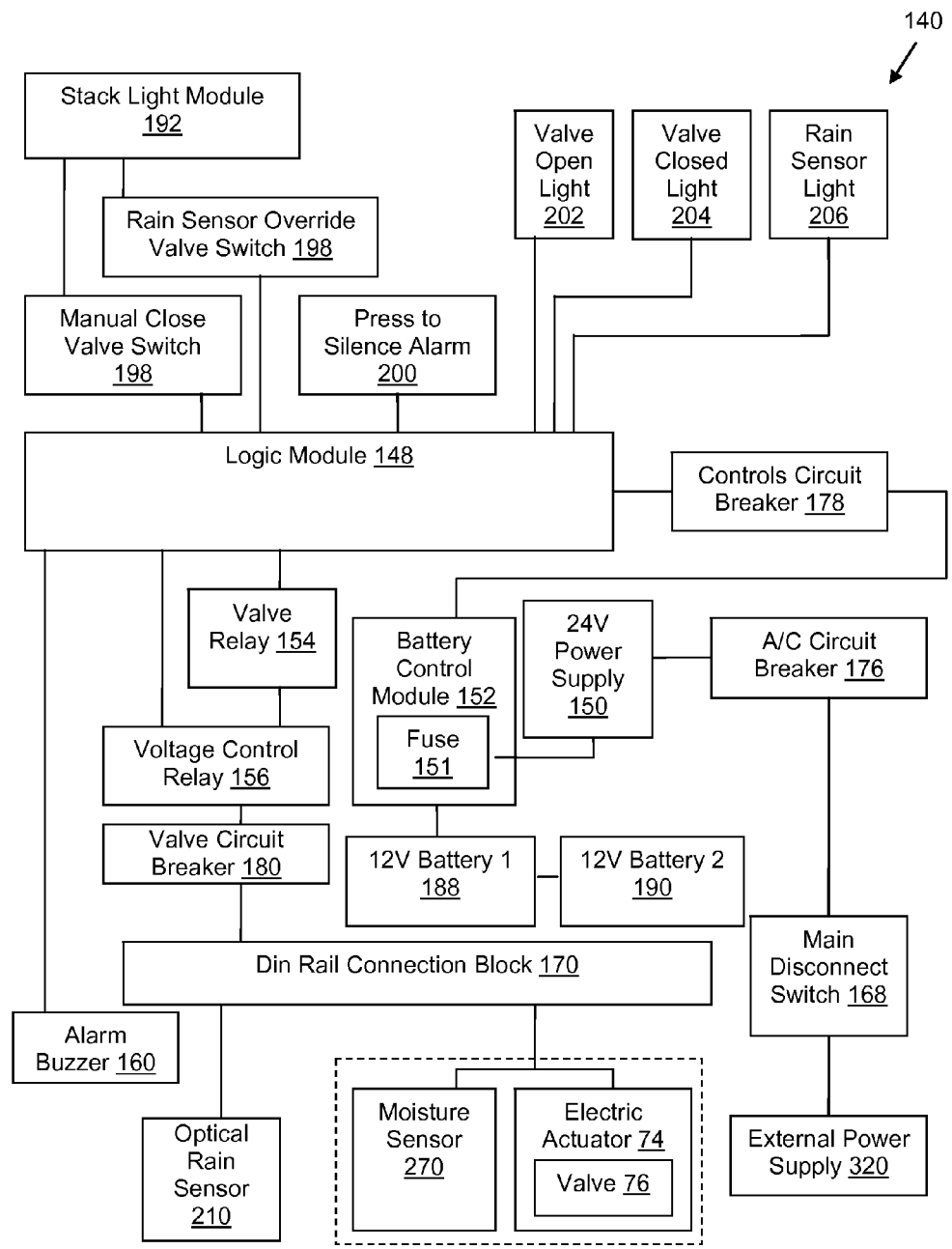
FIG. 15 is a general block diagram of an embodiment of the control system.

Referring to FIG. 15, the control system 140 further comprises a logic module or programmable microprocessor-based device 148.

In one embodiment, the logic module 148 is in the form of a programmable logic controller (PLC) and in particular, but not limited to, a SIEMENS LOGIC MODULE, LOGO 12/24RC, 12/24VDC, 10 A sold under part number 6ED1052-1MD00-0BA6.

Figure 16:
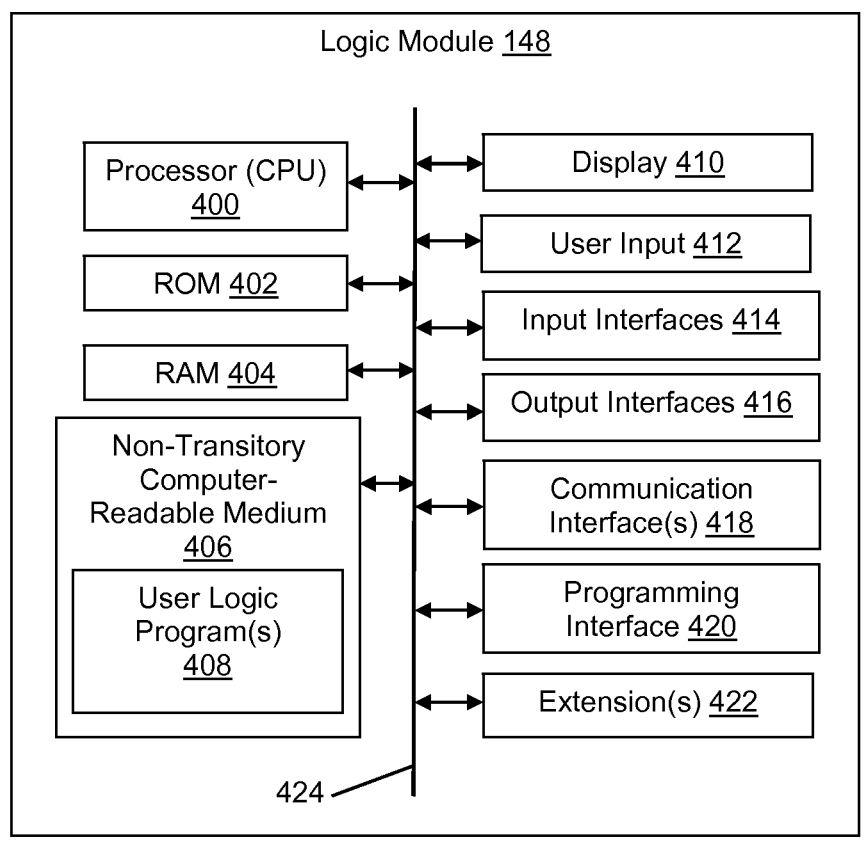
FIG. 16 is a general block diagram of an embodiment of a logic module of the control system wherein the logic module is, in one embodiment, a programmable microprocessor-based device in the form of a programmable logic controller (PLC).

Referring to FIG. 16, the logic module 148 comprises a processor device or central processing unit (CPU) 400; a hardware read only memory device (ROM) 402; a hardware main memory device (RAM) 404; a non-transitory computer-readable medium or memory 406 providing application/program storage for application/program 408; a user display 410, a user input device 412, an input interface 414, an output interface 416, and a communication interface device 418, a programming interface 420, extension lines 422, and a system bus 424 which comprises one or more conductor or communication paths that permit communication among the devices of the logic module 148.

The CPU or processor device 400 reads converted input signals from the input interface 414, executes the user logic or application program 408 stored in the non-transitory computer-readable medium or memory 408, and then writes the appropriate output signals to the output interface 416. The application program 408 is written in a language called ladder logic.

In addition to executing the user logic or application program 408, the CPU 400 performs a PLC scan process, said PLC scan process comprising the steps of: performing an input scan that detects the state of all input devices that are connected to the logic module 148; performing a program scan that executes the user created program logic or application program 408, which is called a ladder logic program; performing a output scan that energizes or de-energizes all output devices that are connected to the PLC.; and performing housekeeping by communicating with programming terminals (CPU transfers program and data between itself and the programming terminal), performing internal diagnostics, et cetera. These steps are continually processed in a loop.

The CPU is controlled by operating system software. The operating system software is a group of supervisory programs that are loaded and stored permanently in a memory of the PLC by the PLC manufacturer. Typically ROM 402 is used to store programs and data that should not be altered. For example, the operating system software of the PLC.

ROM 402 is a nonvolatile memory device (memory that retains stored information even without power) that typically stores program information that allows the CPU 400 to interpret and act on the ladder logic program stored in the Non-transitory computer-readable medium or memory 406.

RAM 404 is a volatile memory device: memory that does not retain stored information without power.

Non-transitory computer-readable medium or memory 406 stores, inter alia, software or application instructions embodying or utilized by any one or more of the methodologies or functions described herein.

These software or application instructions include executable code that may also reside, completely or at least partially, within the RAM 404 and/or within the CPU or processor device 400 during execution thereof by control system 140 wherein the RAM 404 and the processor device 400 also constitute non-transitory computer-readable media or memory.

In one embodiment, the non-transitory computer-readable medium is in the form of, but not limited to, a non-volatile flash memory that stores coded application instructions embodying or utilized by any one or more of the processes or methods described herein.

Examples of non-volatile flash memory include, but are not limited to, Solid-State Drive (SSD) devices, electrically programmable read only memory (EPROM), electrically erasable programmable read only memory (EEPROM), et cetera. In other words, any suitable media that is not fleeting or devoid of any semblance of permanence during transmission, and/or any suitable tangible media.

Display device 410 and user input 412 allow user interaction with the logic module 148.

Input interfaces 414 can accept discrete or analog signals of various voltage and current levels.

Output interfaces 416 operate much the same as the input interfaces 414 with the exception that the output interfaces 416 are either sinking (supplying a ground) or sourcing (providing a voltage) discrete voltages or sourcing analog voltage or current.

The input and output interfaces 414, 416 are designed in this way to minimize or eliminate the need for any intermediate circuitry between the PLC and the process to be controlled.

Communication interface device 418 provides means for communicating with one or more machine or computer systems via one or more communication networks for receiving and transmitting data.

Programming interface 420 is utilized to couple the logic module 148 with a personal computer via a direct-connection cable or over a network and download a ladder logic program from personal computer and store it in memory of the logic module 148 such, for example, the non-volatile flash memory 406.

Extensions lines 422 are utilized to extend the limited number of input/output lines of the logic module 148 by coupling certain additional modules to the logic module 148 through extension lines 422. Each module can contain extension both of input and output lines.

Also, extension modules can have inputs and outputs of a different nature from those on the logic module 148.

The logic module 148 is a control device. It take information from inputs and makes decisions to energize or de-energize outputs. The decisions are made based on the statuses of inputs and outputs and the ladder logic program that is being executed.

Ladder Logic

Figure 17A:
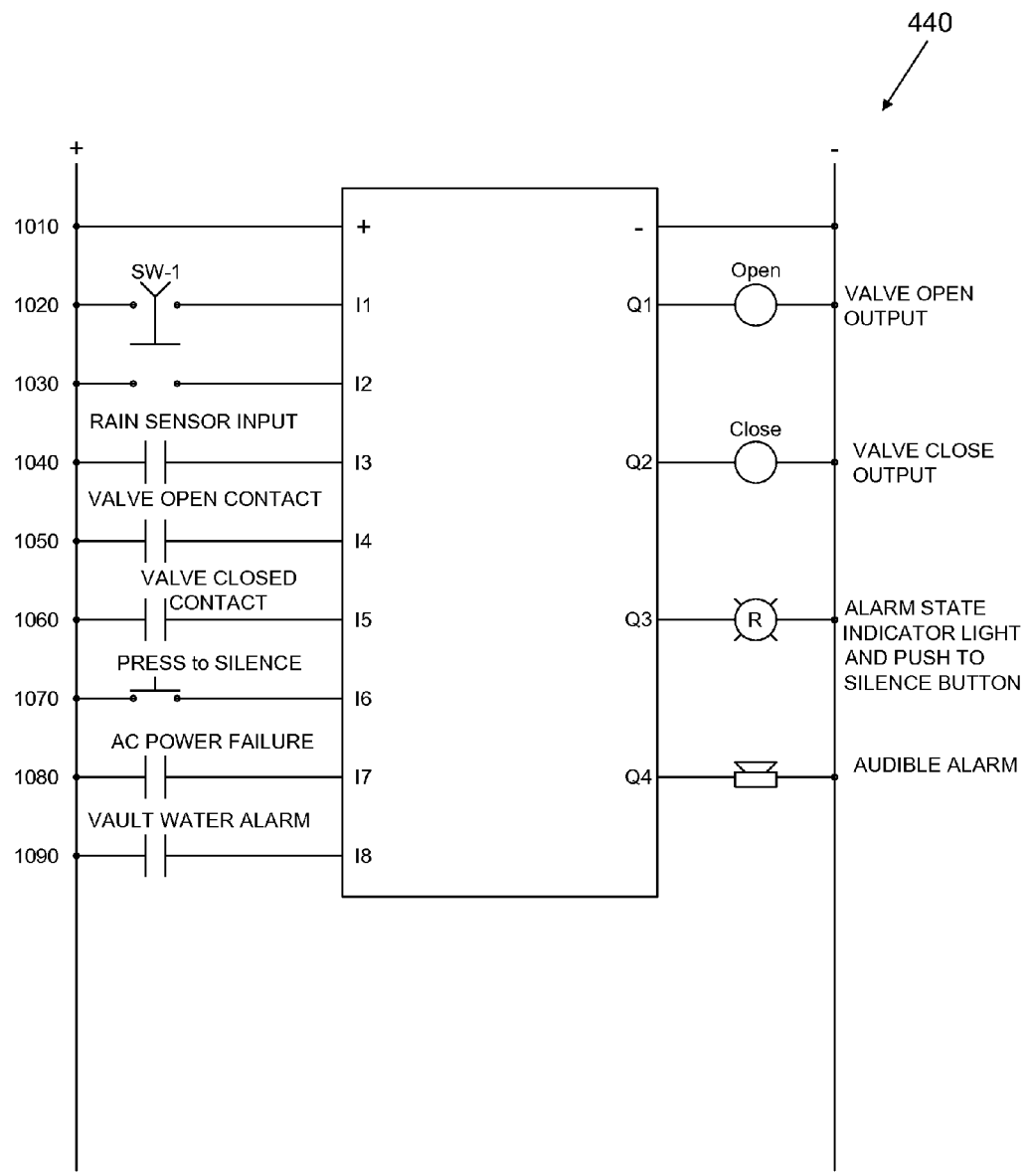
FIGS. 17A-17B are a view of a ladder diagram representative of an embodiment a ladder or user logic program of the multi-mode control process of the storm water protection system.
Figure 17B:
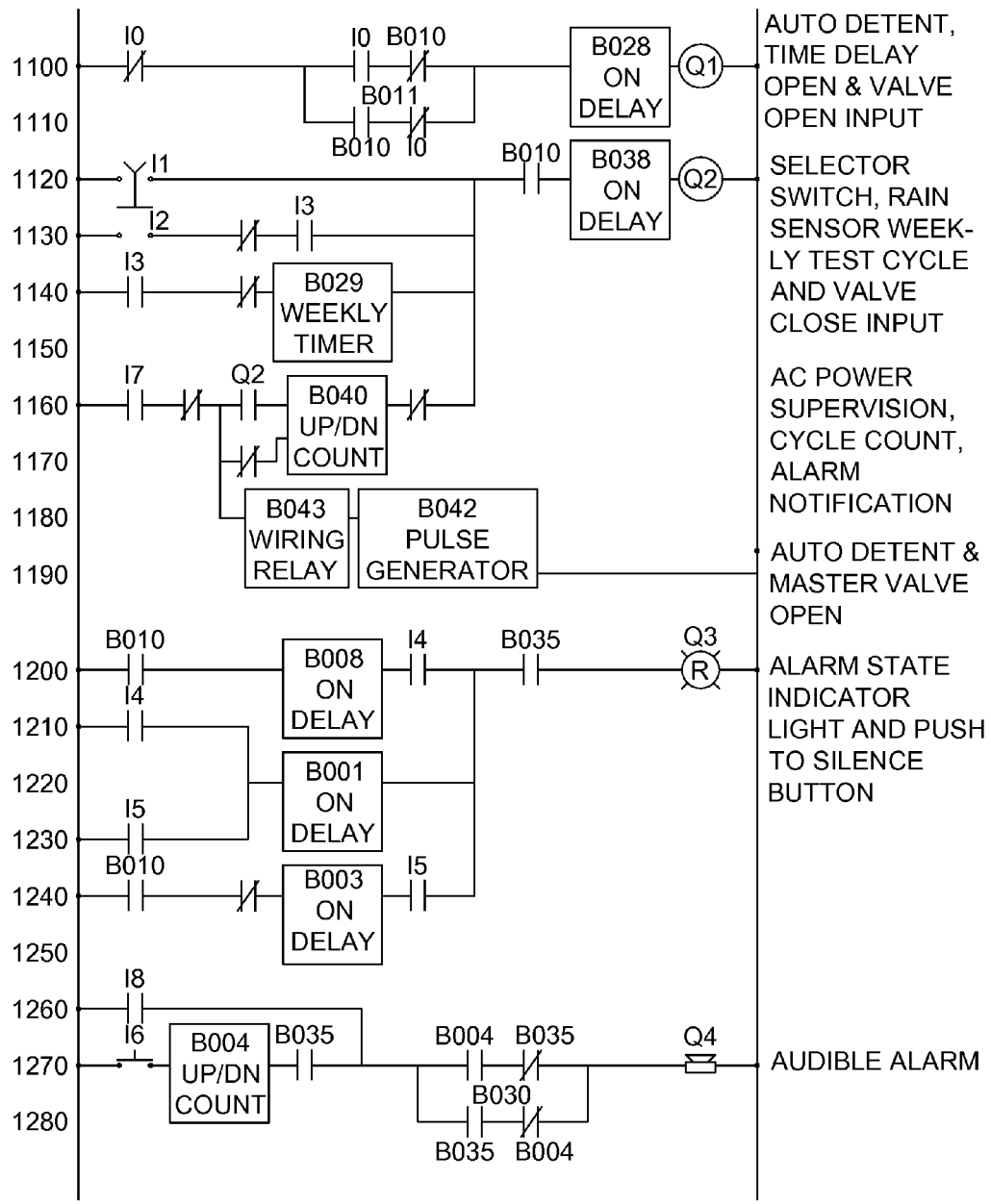

FIGS. 17A-17B illustrate a ladder diagram that is translated into the user logic program 408. The ladder diagram illustrates the Logic module 148 comprising eight digital inputs and four output relays.

Figure 20:
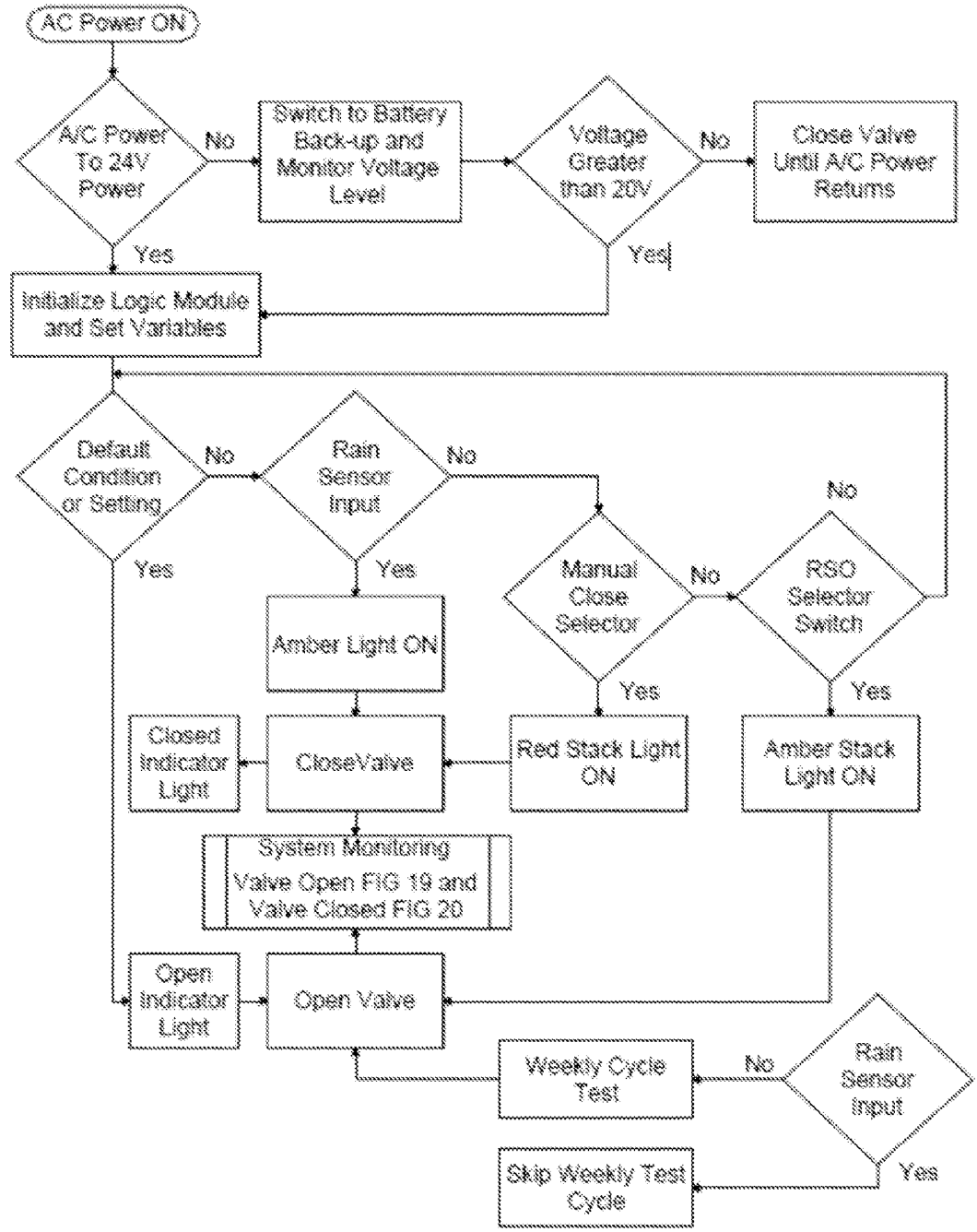
FIG. 20 is a flow diagram of an embodiment of an operational and monitoring method of the control system.
Figure 21:
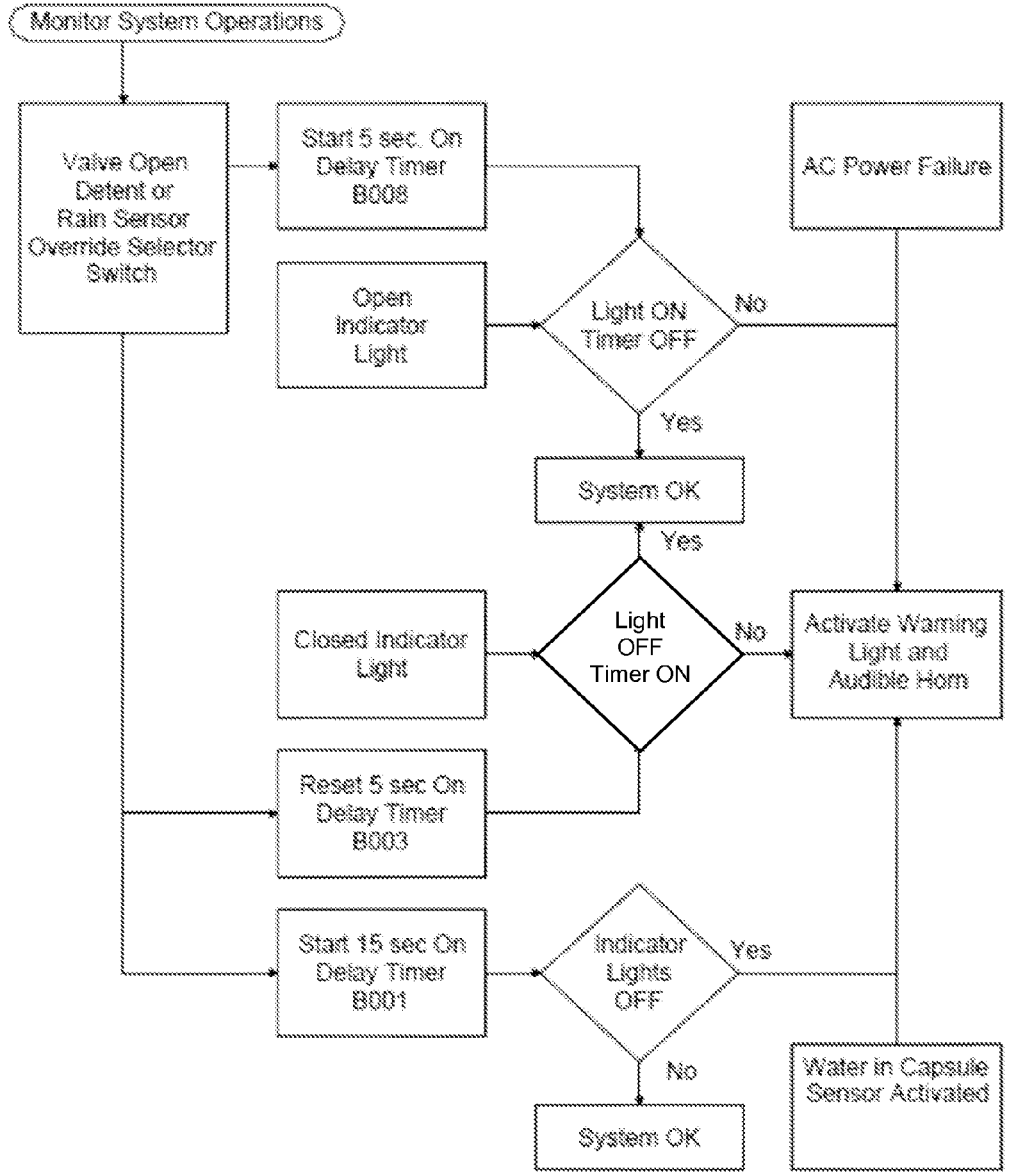
FIG. 21 is a flow diagram of an embodiment of an open valve monitoring system operational method of the control system.
Figure 22:
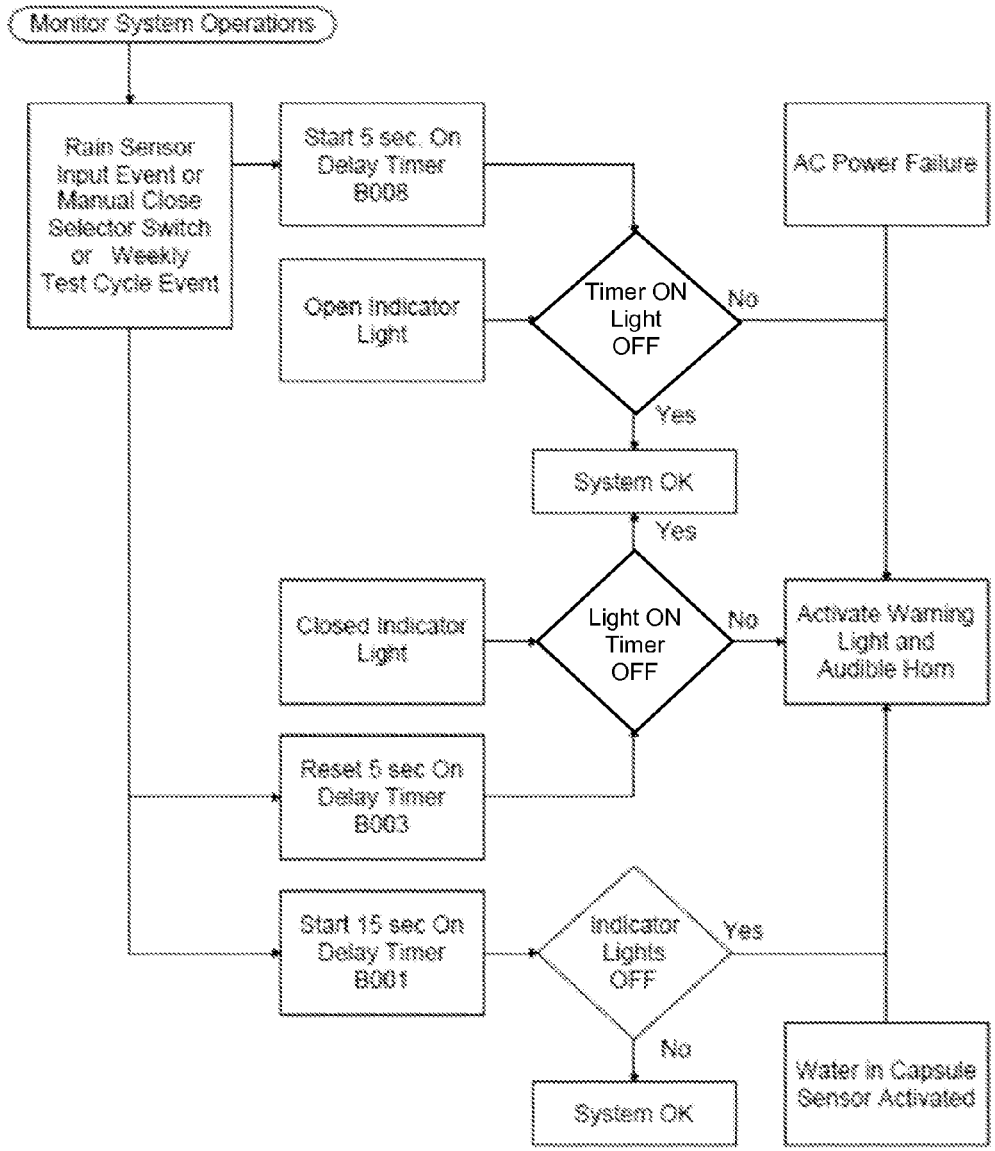
FIG. 22 is a flow diagram of an embodiment of a closed valve monitoring system operational method of the control system.

FIG. 20 illustrates a general flow diagram of an embodiment of an operational and monitoring method or user logic program 408 of the control system 140. FIG. 21 illustrates a general flow diagram of an embodiment of an open valve operational method of the control system 140 and FIG. 22 is a flow diagram of an embodiment of a closed valve operational method of the control system 140.

Referring to FIG. 20 and with selector switch 198 in an AUTO or default position, a power on condition will initialize the logic module 148, test the inputs to the logic module 148 for non-default conditions and place the valve member 76 in an open default position.

With reference to FIGS. 17A-17B and to FIG. 20, the above referenced eight digital inputs are as follows:

Input one is high if selector switch 198 is in rain sensor override (RSO) position. The valve member 76 can be manually opened by system 140 if need be in a rain condition. For example, if a barrel is dropped on the work area and the bulk wine is about to go into the storm drain then opening the valve member 76, by selecting the rain sensor override valve switch 198 which turns on amber stack light 196, for allowing the wine infused rain water to go into the process holding tank 310. When the mess is cleaned up the selector switch 198 can be returned to the Auto detent position and if it is still raining than the valve member 76 will close.

Input two is a manual close input and if the manual close position on the selector switch 198 is selected the module 148 allows for the valve member 76 to be closed for testing and routine maintenance which turns on red stack light 194.

Input three is a rain sensor input. If more than a light drizzle is detected by the optical rain sensor 210 than this input will receive a high signal closing the valve member 76 and diverting the rain water into the storm drain system or waterway 300.

Input four is high when the valve member 76 has traveled to its full open position. This input allows for the monitoring of the valve operations as illustrated in FIG. 21. If the valve member 76 does not reach its full open position within a given time limit, an alarm signal is sent to output three and four delineated hereinbelow thereby notifying personnel that there is a problem with the system 10.

Input five is high when the valve member 76 has traveled to its full closed position. This input allows for the monitoring of the valve operations as illustrated in FIG. 22. If the valve member 76 does not reach its full closed position within a given time limit, an alarm signal is sent to output three and four delineated hereinbelow thereby notifying personnel that there is a problem with the system 10.

Input six is a press to silence input. If there is an alarm condition and indicator light of indicator light/switch 200 is lit than alarm buzzer or horn 160 will be sounding an audible alarm. Personnel troubleshooting the problem can silence the audible alarm by pushing the lens on indicator light/switch 200 to silence the audible alarm for predetermined amount of time. If the condition has not been corrected after that time then the audible alarm will sound again and remain on until the problem is resolved or the lens on indicator light/switch 200 is pushed again.

Input seven is an AC power failure input. If AC power is lost, a battery control module 152 automatically switches over to battery back-up mode, and a low condition at input seven will sound an audible alarm different than the other alarm to indicate to personnel that there is a AC power failure. This audible alarmed is set to only last a predetermined amount of time, thereby preserving battery power for operation of the control system 140 and the valve member 76. A low condition at input seven also starts the process of monitoring the voltage levels of the battery backup 186 comprising batteries 188 and 190. If battery voltage drops to a predetermined level, the valve is defaulted to the closed position reserving the remaining battery power for other control functions. When AC power is returned, the system resets to the default settings.

Input eight is a vault water alarm input. Any infiltration of moisture in the vault capsule assembly 20 could short out the valve assembly 72. Accordingly, the optical fluid level sensor 270 is place directly against the floor or top surface 62 of the bottom lid 52 of the encapsulating capsule 22 of the vault capsule assembly 20 and will detect any moisture in the bottom of the encapsulating capsule 22. If moisture is detected input eight will go high and an audible alarm will be initialized via alarm buzzer or horn 160 and personnel will be notified of the possible water problem.

With reference to FIGS. 17A-17B and to FIG. 20, the above referenced four output relays are as follows: Output one is a 24VDC output to the valve relay block 154 directing the valve member 76 to open. Output two is a 24VDC output to the valve relay block 154 directing the valve member 76 to close. Output three is a lights alarm indicator output to power the light of indicator light/switch 200. Output four is a sounds alarm horn output to actuate alarm 160.

24 Volt Power Supply

Referring back to FIG. 15, the 120VAC to 24VDC transforming power supply module 150 receives facility provides AC power 320 through conduit 166 to main disconnect switch 168 and the AC breaker 176 to converts 120vac to 24vdc power for the operation of the control system 140 and valve assembly 72.

Battery Control Module

The battery charging/monitoring or control module 152 receives converted 24VDC power from the power supply module 150 and maintains the fully charged condition of batteries 188 and 190. If an AC power failure occurs, the battery control module 152 immediately switches from DC power supply module 150 to the battery supplied voltage, maintaining proper operation of the equipment during a power outage caused by the utilities or a storm. When AC power 320 returns the battery control module 152 returns to charging the batteries 188 and 190 and wait for a future power failure.

Valve Relay Block

The valve relay block 154 provides the directional control of the electric actuator 74 to open or close the valve member 76. Power for electric actuator 74 to operate the valve member 76 is provided by the DC power supply 150 and the relays are controlled by outputs one and two of the logic module 148 as delineated hereinabove. Power at output one directs the relay to provide 24vdc power to the electric actuator 74 causing the valve member 76 to open. Conversely, power at output two directs the relay to reverse polarity to the electric actuator 74 causing the valve member 76 to close.

Disconnect Switch

A three pole 16 amp main disconnect switch 168 is provided from facility 120VAC power supply 320 to A/C circuit breaker 176. Rotating the main disconnect switch 168 to the off position interrupts all AC power to the control system 140 and valve assembly 72 thereby providing a quick disconnect for emergencies and routine maintenance.

AC Breaker

The 240VAC 6 Amp circuit breaker 176 protects the AC side of the circuitry. The switch is connected between disconnect switch 168 and DC power supply module 150 and provides circuit protection in case of an overload condition.

Controls Breaker

A 24VDC 2 Amp controls breaker 178 is connected between the DC power supply module 150 and the logic module 148 for providing circuit protection for the logic module 148 in case of an overload condition.

Valve Breaker

A 24 AC 4 Amp valve circuit breaker 180 is utilized to protect the electric actuator 74 in case of an overload condition and is connected between the DC power supply module 150 and the valve relay block 154.

Batteries

Battery backup system 186 (FIG. 3) is comprised of a first battery 188 and a second battery 190 as illustrated in FIG. 19. In one embodiment, both batteries are 12 V 12 Amp hour lead acid batteries with 400 life cycles. Battery 188 is connected to battery 190 in series to provides the 24vdc power for the battery back-up system 186. The batteries are connect to the battery control module 152 and are maintained in a fully charged condition until an AC power failure at which time the batteries provide the stored power back to the control system 140.

Stack Light

In one embodiment, a 24 volt stack light 192 is utilized and comprises red light 194 and amber light 196. The stack light 192 is connected directly to the selector switch 198.

When a position of the selector switch 198 is other than "AUTO" the system is considered to be in an override condition. If the selector switch 198 is in the manual close position the red light 194 of the stack light 192 will be illuminated and flashing. If the selector switch 198 is in the rain sensor override position the amber light 196 of the stack light 192 will be illuminated. The overriding purpose of the stack light 192 is to warn, by providing different visual feedback colors, personnel that they need to return the system back to automatic as soon as conditions allow.

Horn

In one embodiment, the horn or alarm 160 is a 24 volt horn that has an output of 103 dba. The horn 160 is connected to output three of the logic module 148 wherein the module 148 is configured to sound an audible alarm via horn 160 if the system finds a condition that need to be addressed. The horn 160 is tied together with the indicator light/switch 200 and can be silenced if need be for a predetermined time by pressing the lens on the indicator light/switch 200.

Terminal Block

In one embodiment, terminal block 158 is a 20 Amp 12 AGW rail mounted device that provides for a quick connection of control panel wiring to incoming wiring from rain sensor conduit entry 162, vault conduit entry 164, and AC power supply conduit entry 166.

Wiring Dins

In one embodiment, wiring dins 170, 172, and 182 are employed for connection purposes as is well known in the art, and informed by the present disclosure.

Battery Shelf

In one embodiment, a custom 13¾×4×⅛ inch steel shelf 184 is utilized to support batteries 188 and 190.

Panel Lights

In one embodiment, a 24 volt green panel mount indicator light 202 is connected to contacts in the electric actuator 74 for providing positive indication that the valve member 76 is open.

In one embodiment, a 24 volt red panel mount indicator light 204 is connected to contacts in the electric actuator 74 for providing positive indication that the valve member 76 is closed.

In one embodiment, a 24 volt amber panel mount indicator light 206 is connected to a relay in the optical rain sensor 210 for indicating that the rain sensor 210 is sensing or seeing rain.

Alarm Light/Push to Silence Button

In one embodiment, the alarm light/push to silence button or the indicator light/switch 200 is a 24 volt 22 millimeter panel mounted device that is connected to output three of logic module 148 and illuminates when the system 10 is in an alarm state. The light will remain illuminated as long as the problem persists and resets if problem is remedied. As noted above, pushing lens silences horn 160 for a predetermined time. After time elapses and problem has not been resolved, horn 160 will be audible again.

Selector Switch

In one embodiment, the selector switch 198 is a three position two normally open selector switch wherein one open contact of the selector switch 198 is connected to DC power supply module 150 and the other open contact is connected to provide operator input to the logic module 148 to override automatic default settings. The center position of the selector switch 198 is the Auto Detent position and is set at this location during normal conditions for defining a normal operating mode wherein the valve member 76 is in an open state or position. The left position of the selector switch 198 defines the manual close mode which overrides automatic setting to close the valve member 76. The right position of the selector switch 198 defines the rain sensor override (RSO) which overrides the signal from the rain sensor 210 and opens the valve member 76.

Rain Sensor

In one embodiment, the rain sensor 210 is a 24VDC Optical Rain Sensor with a relay interface. The rain sensor 210 is intended to be mounted in a remote location that will provide the best rain sensing. The sensor 210 is connected by wire or cable 208 to din rail 170 via conduit 162 which operatively couples the sensor 210 to logic module 148. The sensor 210 is powered by the power supply module 150 and relays a high input to input three when a rain condition exists. The sensor 210 can indicate the presence of different levels of rain and the output can be set by dip switches in the rain sensor 210. Rain amounts can be calculated to provide first flush capabilities, and the output signal can be maintained an additional 15 minutes to provide for runoff to reach the drainage and to keep contacts from cycling on and off rapidly.

In one embodiment, the rain sensor 210 is in the form of, but not limited to, a model RG-11 rain sensor manufactured by the Hydreon Corporation, 6440 Flying Cloud Drive, Suite 207, Eden Prairie, Minn. 55344.

Voltage Control Relay

The voltage control relay 156 monitors the voltage level of the batteries 188, 190 during an AC power failure. If the back-up battery power drops to low, the electric actuator 74 could be damaged. A low voltage situation might leave the valve member 76 caught somewhere between full open or full closed when the voltage drops too low to operate the valve, also, not a good situation. To prevent an electric actuator 74 failure the voltage control relay 156 will signal the logic module 148 that a low voltage condition is present. In turn, the valve member 76 is directed to close or remain closed until AC power returns. The preferred method is to default to the closed position during an extended power outage, usually during a rain storm.

Capsule Water Sensor

In one embodiment, the water sensor 270 is a 28 DC volt optical liquid level sensor that uses an infra-red phototransistor to read the amount of light reflecting off of the inside of the lens when the sensor is in the air. When liquid is present the reflection changes, this change in value triggers an output signal that is read by logic module 148. Water present in the valve capsule assembly 20 will initiate an alarm state. The sensor is suspended above the top surface or floor 62 of the bottom lid 52 of the encapsulating capsule 22 by a housing and is connected to the system 140 by wire 248. By placing the sensor in a vertical position the presence of even very small amounts of water can be detected.

In light of the above description of the control system 140 with reference to FIGS. 15 through 19, a flow diagram of an embodiment of an operational and monitoring method of the control system is illustrated in FIG. 20. Additionally, FIG. 21 is a flow diagram of an embodiment of an open valve monitoring system operational method of the control system. Furthermore, FIG. 22 is a flow diagram of an embodiment of a closed valve monitoring system operational method of the control system.

In Use and Operation

Figure 23:
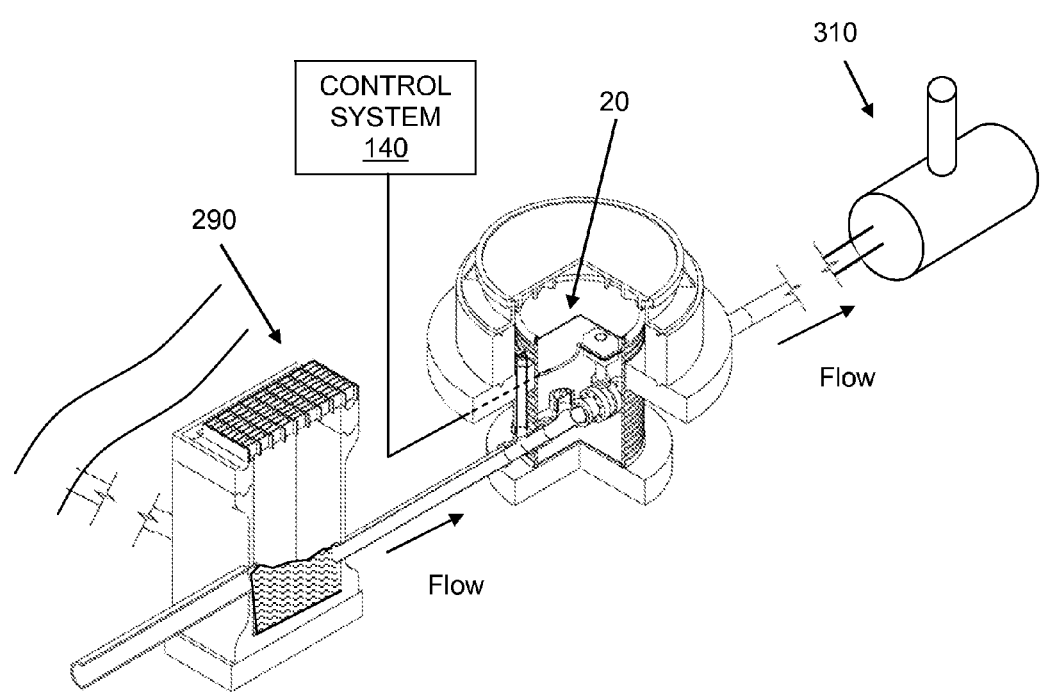
FIG. 23 is a partial cutaway perspective view of an embodiment of the storm water protection system communicating waste water or liquid waste products to a process waste water system such as the process waste water tank or holding tank for further processing.
Figure 24:
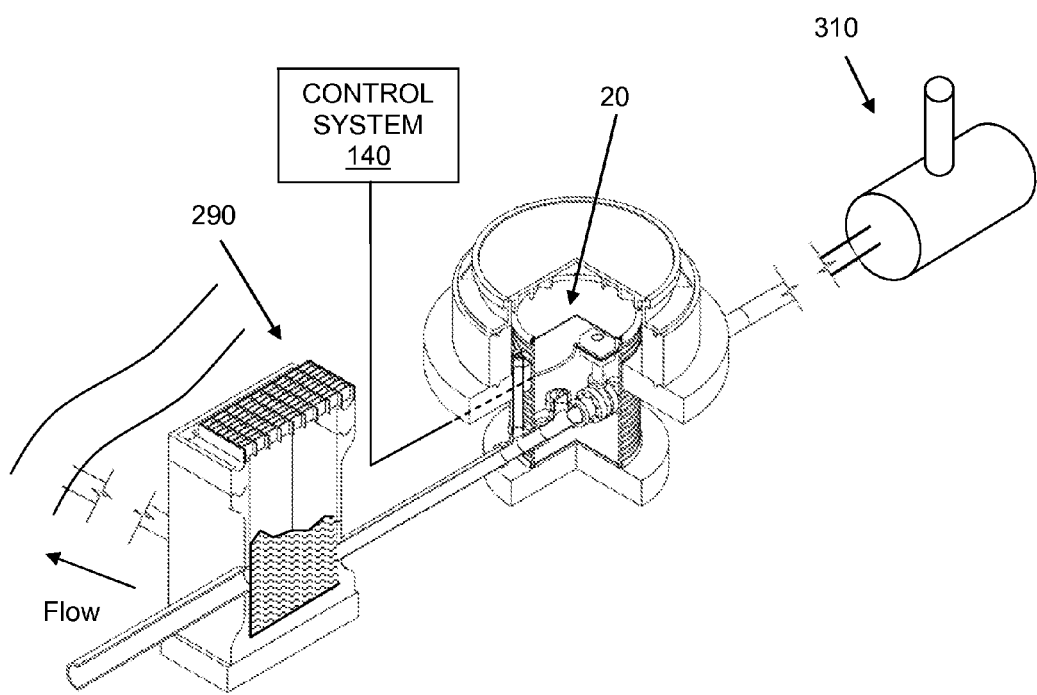
FIG. 24 is a partial cutaway perspective view of an embodiment of the storm water protection system communicating storm water to a storm water system such as a waterway.

In use and operation, and in light of the description hereinabove with reference to FIGS. 1 through 22 the winery storm water protection system 10 is comprised of the valve capsule assembly 20 disposed under the crush pad 280 of a winery and the control system 140 operatively coupled to the valve capsule assembly 20 for providing, under the orchestration of the control system 140, a default open position or first state for opening fluid communication between the crush pad or drop inlet drain assembly 290 and the holding tank 310 and for closing fluid communication to the waterway 300 such as a river as illustrated in FIG. 23 and a closed position or second state upon the sensing of precipitation such as rain for closing fluid communication between the crush pad or drop inlet drain assembly 290 and the holding tank 310 thereby blocking the passage of rainwater from entering the holding tank 310 and for opening fluid communication to the waterway 300 such as the river for conveying the rainwater to the waterway 300 as illustrated in FIG. 24.

In one embodiment, and referring to FIG. 20, the winery storm water protection system 10 performs a weekly test or massage cycle that is skipped if rain has been detected during a prior predetermined period of time (e.g., during the last week) and is actuated to close for a prior predetermined period of time (e.g., 60 seconds), then open and cycle back closed. If the valve cycles, no action is required and if the valve does not cycle an alarm actuates. Thus, the system 10 automatically massages the valve with a weekly cycle to keep the valve in working order, free of binding or debris build up.

In light of the above, an embodiment of the winery storm water protection system 10 is utilized to separate rain water or storm water runoff from water used in the processing or manufacturing of goods. The water used in such manufacturing is known as processed waste water and is considered to be septage, regulated by law, and shall not flow into storm water systems. Such water shall be treated prior to dispersal back into the natural environment.

Alternative uses of the system 10 include, for example the cattle, dairy, cheese making, olive pressing, and beverage industries including beer and other alcoholic beverages.

In one aspect, an embodiment of the winery storm water protection system 10 allows for the sharing of processed waste and storm water drainage systems in common facilities, reducing cost, reducing construction time, and eliminating the requirement for covered structures over work areas thereby reducing the carbon footprint of developments.

In another aspect, an embodiment of the winery storm water protection system 10 allows for a decrease in the carbon footprint of new projects and remodeled projects by, for example, reducing greenhouse gas emissions by reducing the need for construction materials, and construction equipment such as cranes or delivery trucks burning heavy fossil fuels.

In another aspect, an embodiment of the winery storm water protection system 10 may be installed in a traffic rated areas underneath man hole covers and is not required to be remotely located. Heavy vehicle traffic may operate over the valve capsule assembly 20.

In another aspect, an embodiment of the winery storm water protection system 10 operates in all weather circumstances without human intervention.

In another aspect, an embodiment of the winery storm water protection system 10 utilizes a cost effective means by encapsulating the valve assembly in a water tight capsule capable of direct burying, and is not subject to moisture intrusion which reduces failures and extends the life cycle of the valve assembly.

In another aspect, an embodiment of the winery storm water protection system 10 comprises a valve capsule assembly 20 that is light weight and can be manipulated by a single person for installation without the need for cranes or lifting equipment.

In a another aspect, an embodiment of the winery storm water protection system 10 comprises a valve capsule assembly 20 which is accessible for repair.

The above delineation of the system 10, including its methods and aspects demonstrate the industrial applicability of this invention.

Moreover, it should be apparent that numerous modifications and adaptations may be resorted to without departing from the scope and fair meaning of this invention as set forth hereinabove and as described herein below by the claims.

We claim:

1. A winery storm water protection system, said system comprising:
   an encapsulating capsule disposed under a crush pad of a winery, said encapsulating capsule comprising:
      a hollow fluid impervious body having an open top end, an open bottom end, and a circumscribing sidewall extending between said open top end and said open bottom end, said circumscribing sidewall having an inner circumscribing surface defining an open ended chamber extending along a central longitudinal axis of said encapsulating capsule;
      a top lid detachably coupled on said open top end of said body for closing said open top end of said body; and
      a bottom lid permanently coupled on said open bottom end of said body for closing said open bottom end of said body wherein closing said open top and bottom ends of said body with said top and bottom lids closes said open ended chamber for forming an isolation chamber of said encapsulating capsule;

a valve assembly disposed within said isolation chamber of said encapsulating capsule, said valve assembly comprising:
  a valve body having a fluid passage including a upstream port and a downstream port;
  a valve member located within said valve body wherein said valve member is configured to move between an open position to allow fluid flow between said upstream port and said downstream port and a closed position to block fluid flow between said upstream port and said downstream port; and
  an electric actuator operatively coupled to said valve member for opening or closing said valve member when actuated;

an upstream pipeline extending through a first opening in said circumscribing sidewall of said encapsulating capsule;

said upstream pipeline having a first end operatively coupled to said upstream port of said fluid passage of said valve body and a second end operatively coupled to and in open fluid communication with a crush pad drain assembly disposed in and under the crush pad of the winery;

a downstream pipeline extending through a second opening in said circumscribing sidewall of said encapsulating capsule, said downstream pipeline having a first end operatively coupled to said downstream port of said fluid passage of said valve body and a second end operatively coupled to and in open fluid communication with a holding tank.

2. The system of claim 1 further comprising:
a rain sensor;
a programmable logic controller operatively coupled to said electric actuator assembly and said rain sensor;
said programmable logic controller being configured to provide a control signal to said electric actuator assembly in response to receiving a rain sensed signal from said rain sensor to actuate the closing of said valve member from a default open position for closing fluid communication between the crush pad drain assembly disposed in and under the crush pad of the winery and the holding tank while simultaneously opening fluid communication between the crush pad drain assembly and a storm drain system or waterway; and
said programmable logic controller being configured to provide a control signal to said electric actuator assembly to massage said valve member by opening and closing said valve member after a predefined period of time in which a rain sensed signal has not been received to keep said valve member free of binding or clear of debris build up.

3. The system of claim 2 further comprising a stack light operatively coupled to said programmable logic controller and comprising an inferior light providing a first visual feedback color surmounted by a superior light providing a second visual feedback color different than said first visual feedback color.

4. The system of claim 3 further comprising a selector switch operatively coupled to said stack light and said programmable logic controller, said selector switch having an auto default position, a rain sensor override position, and a manual close position wherein said inferior light providing said first visual feedback color is illuminated when said selector switch is in said manual close position and said superior light providing said second visual feedback color different than said first visual feedback color is illuminated when said selector switch is in said rain sensor override position wherein said inferior and superior lights provide first and second different visual feedback colors as visual reminder to return said selector switch back to said auto default position.

5. The system of claim 4 wherein said first visual feedback color is red.

6. The system of claim 4 wherein said second visual feedback color is amber.

7. The system of claim 4 further comprising said programmable logic controller being configured to respond to said rain sensor override position of said selector switch to provide a control signal to said electric actuator assembly to open said valve member.

8. The system of claim 7 further comprising said programmable logic controller being configured to respond to said manual close position of said selector switch to provide a control signal to said electric actuator assembly to close said valve member.

9. The system of claim 1 further comprising a water sensor operatively coupled to said programmable logic controller and suspended within the isolation chamber of said encapsulating capsule above a top surface of said bottom lid of said encapsulating capsule wherein said water sensor is an infra-red phototransistor that outputs a signal to said programmable logic controller when a change in reflection occurs as a function of a change in an amount of light reflecting off of an inside lens of said infra-red phototransistor in the presence of air only and in a presence of water disposed in said encapsulating capsule.

10. The system of claim 9 further comprising said programmable logic controller being configured to provide an alarm in response to said output of said signal from said water sensor.

11. A winery storm water protection system, said system comprising:
an encapsulating capsule disposed under a crush pad of a winery, said encapsulating capsule comprising an interior isolation chamber;
a valve assembly disposed within said isolation chamber of said encapsulating capsule, said valve assembly comprising:
  a valve body having a fluid passage including a upstream port and a downstream port; and
  a valve member located within said valve body wherein said valve member is configured to move between an open position to allow fluid flow between said upstream port and said downstream port and a closed position to block fluid flow between said upstream port and said downstream port; and
  an electric actuator assembly operatively coupled to said valve member for opening or closing said valve member when actuated;
an upstream pipeline extending through a first opening in said circumscribing sidewall of said encapsulating capsule, said upstream pipeline having a first end operatively coupled to said upstream port of said fluid passage of said valve body and a second end operatively coupled to and in open fluid communication with a crush pad drain assembly disposed in and under the crush pad of the winery;
a downstream pipeline extending through a second opening in said circumscribing sidewall of said encapsulating capsule, said downstream pipeline having a first end operatively coupled to said downstream port of said fluid passage of said valve body and a second end operatively coupled to and in open fluid communication with a holding tank;

a rain sensor;

a programmable logic controller operatively coupled to said electric actuator assembly and said rain sensor;

said programmable logic controller being configured to provide a control signal to said electric actuator assembly in response to receiving a rain sensed signal from said rain sensor to actuate the closing of said valve member from a default open position for closing fluid communication between the crush pad drain assembly disposed in and under the crush pad of the winery and the holding tank while simultaneously opening fluid communication between the crush pad drain assembly and a storm drain system or waterway; and said programmable logic controller being configured to provide a control signal to said electric actuator assembly in order to massage said valve member by opening and closing said valve member after a predefined period of time in which a rain sensed signal has not been received to keep said valve member free of binding or clear of debris build up.

12. The system of claim 11 further comprising a stack light operatively coupled to said programmable logic controller and comprising an inferior light providing a first visual feedback color surmounted by a superior light providing a second visual feedback color different than said first visual feedback color.

13. The system of claim 12 further comprising a selector switch operatively coupled to said stack light and said programmable logic controller, said selector switch having an auto default position, a rain sensor override position, and a manual close position wherein said inferior light providing said first visual feedback color is illuminated when said selector switch is in said manual close position and said superior light providing said second visual feedback color different than said first visual feedback color is illuminated when said selector switch is in said rain sensor override position wherein said inferior and superior lights provide first and second different visual feedback colors as visual reminder to return said selector switch back to said auto default position.

14. The system of claim 13 wherein said first visual feedback color is red.

15. The system of claim 13 wherein said second visual feedback color is amber.

16. The system of claim 13 further comprising said programmable logic controller being configured to respond to said rain sensor override position of said selector switch to provide a control signal to said electric actuator assembly to open said valve member.

17. The system of claim 16 further comprising said programmable logic controller being configured to respond to said manual close position of said selector switch to provide a control signal to said electric actuator assembly to close said valve member.

18. The system of claim 11 further comprising a water sensor operatively coupled to said programmable logic controller and suspended within the isolation chamber of said encapsulating capsule above a top surface of said bottom lid of said encapsulating capsule wherein said water sensor is an infra-red phototransistor that outputs a signal to said programmable logic controller when a change in reflection occurs as a function of a change in an amount of light reflecting off of an inside lens of said infra-red phototransistor in the presence of air only and in a presence of water disposed in said encapsulating capsule.

19. The system of claim 18 further comprising said programmable logic controller being configured to provide an alarm in response to said output of said signal from said water sensor.

20. A winery storm water protection process, said process comprising:

providing a valve capsule assembly buried in earth under and with recess relative to a crush pad of a winery, said valve capsule assembly comprising a valve assembly having a valve member configured to move between an open position to allow open fluid flow communication between an upstream crush pad drain assembly disposed in and under the crush pad of the winery and a downstream holding tank and a closed position to provide open fluid flow communication between the upstream crush pad drain assembly and a storm drain system or waterway;

sensing rain; and controlling the closing and opening of the valve member as a function of the sensed rain wherein the valve member is closed upon a presence of sensed rain and remains open in an absence of sensed rain wherein the closed valve member precludes open fluid flow communication between the upstream crush pad drain assembly disposed in and under the crush pad of the winery and the downstream holding tank and wherein the open valve member provides open fluid flow communication between the upstream crush pad drain assembly disposed in and under the crush pad of the winery and the downstream holding tank.

* * * * *